US008463308B2

(12) United States Patent
Matsuo et al.

(10) Patent No.: US 8,463,308 B2
(45) Date of Patent: Jun. 11, 2013

(54) TERMINAL TRANSMIT POWER CONTROL WITH LINK ADAPTATION

(75) Inventors: Ryoko Matsuo, Bridgewater, NJ (US); Shuichi Obayashi, Fort Lee, NJ (US); Toshikazu Kodama, Morristown, NJ (US); David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 990 days.

(21) Appl. No.: 10/968,244

(22) Filed: Oct. 20, 2004

(65) Prior Publication Data

US 2006/0084460 A1 Apr. 20, 2006

(51) Int. Cl.
*H04B 7/00* (2006.01)
(52) U.S. Cl.
USPC .............................. 455/522; 455/69; 370/328
(58) Field of Classification Search
USPC ..................... 455/522, 69; 370/328
See application file for complete search history.

(56) References Cited

U.S. PATENT DOCUMENTS

| 5,465,399 | A | * | 11/1995 | Oberholtzer et al. | 455/69 |
|---|---|---|---|---|---|
| 7,031,741 | B2 | * | 4/2006 | Lee et al. | 455/522 |
| 7,355,997 | B2 | * | 4/2008 | Qian et al. | 370/328 |
| 7,486,961 | B2 | * | 2/2009 | Lee et al. | 455/522 |
| 7,668,561 | B2 | * | 2/2010 | Au et al. | 455/522 |
| 2002/0058482 | A1 | | 5/2002 | Agin et al. | |
| 2002/0085502 | A1 | | 7/2002 | Chheda et al. | |
| 2002/0105925 | A1 | | 8/2002 | Shoemake | |
| 2003/0003905 | A1 | | 1/2003 | Shvodian | |
| 2003/0039267 | A1 | * | 2/2003 | Koo et al. | 370/465 |
| 2003/0104831 | A1 | | 6/2003 | Razavilar et al. | |
| 2003/0165190 | A1 | | 9/2003 | Sindhushayana | |
| 2004/0082356 | A1 | | 4/2004 | Walton et al. | |
| 2004/0193971 | A1 | | 9/2004 | Soong et al. | |

FOREIGN PATENT DOCUMENTS

| EP | 1286506 | 2/2003 |
|---|---|---|
| EP | 2357867 | 8/2011 |
| WO | 02/09311 | 1/2002 |
| WO | 02/082751 A2 | 10/2002 |
| WO | 2006/44901 A2 | 4/2006 |

OTHER PUBLICATIONS

PCT Search Report dated May 15, 2006 from PCT Application No. US2005/037458.
Kim, Y. et al., "SP-TPC: A Self-Protective Energy Efficient Communication Strategy for IEEE 802.11 WLANs", *IEEE Vehicular Technology Conference*, Sep. 26-29, 2004, Los Angeles, California, pp. 2078-2082.
European Patent Office Search Report dated Mar. 18, 2008 for Application No. 05808895, Reference No. RPH.P54294GP.
XP-002471523, "Power and Rate Adaptation in IEEE802.11a Wireless LANs", Jens Jelitto, Andre Noll Barreto, Hong Linh Truong, IBM Research, Zurich Research Laboratory.

(Continued)

*Primary Examiner* — Nay A Maung
*Assistant Examiner* — Angelica Perez
(74) *Attorney, Agent, or Firm* — Banner & Witcoff, Ltd.

(57) ABSTRACT

Methods for coordinating power usage and link adaptation in wireless communications are described. Terminals and/or access points (APs) may attempt to modify terminals' transmit power in relation to a desired communication data transfer rate. Link adoption may also be used in conjunction with the described methods.

7 Claims, 20 Drawing Sheets

OTHER PUBLICATIONS

European Patent Office Examination Letter for Application 05808895.6-2411, Reference No. RPH.P54294EP.Is dated Apr. 10, 2008.
Notice of Reasons for Rejection in Japanese Patent Application No. 2007-537981 dtd Mar. 1, 2011.
Office Action South Korean Application No. 10-2007-7009101, mailed Jul. 26, 2011.
Office Action corresponding Chinese Patent Application No. 200580034547.2, mailed Jul. 14, 2011.
Office Action corresponding Chinese Patent Application No. 200580034547.2, mailed Oct. 16, 2009.
Information Rate and System Capacity of WCDMA Systems under non ideal Power Control, by Zhang Yan et al, Journal of Electronics & Information Technology, vol. 25-5, p. 639. (See CN Office Action of Jul. 14, 2011, as concise statement of relevancy).
Office Action for corresponding Chinese Patent Application No. 200580034547.2 issued Oct. 16, 2009.
Partial International Search Report for corresponding European Patent Application No. 05 808 895.6-2411 dated Nov. 16, 2007.
Search Report for corresponding European Patent Application No. 05 808 895.6-2411 dated Mar. 18, 2008.
Extended Search Report for corresponding European Patent Application No. 10183281.4-2411 dated Nov. 15, 2010.
Chinese Application No. 200580034547.2-Office Action dated Apr. 23, 2012.
English translation of Notice of Preliminary Rejection issued Jul. 30, 2012 from Korean App. No. 10-2007-7009101.
Rejection Decision for Chinese Application No. 200580034547.2 dated Jan. 29, 2013.

* cited by examiner

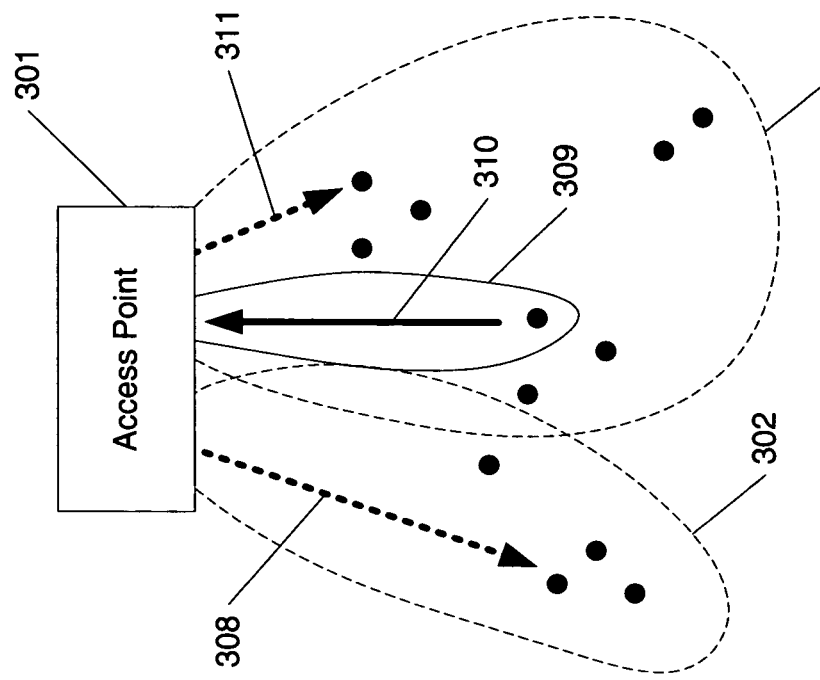
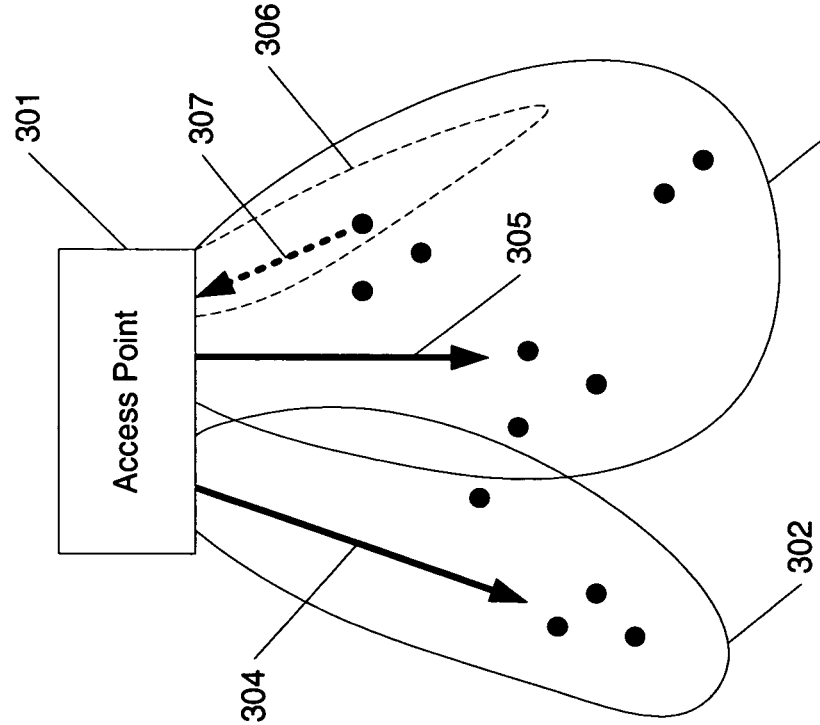

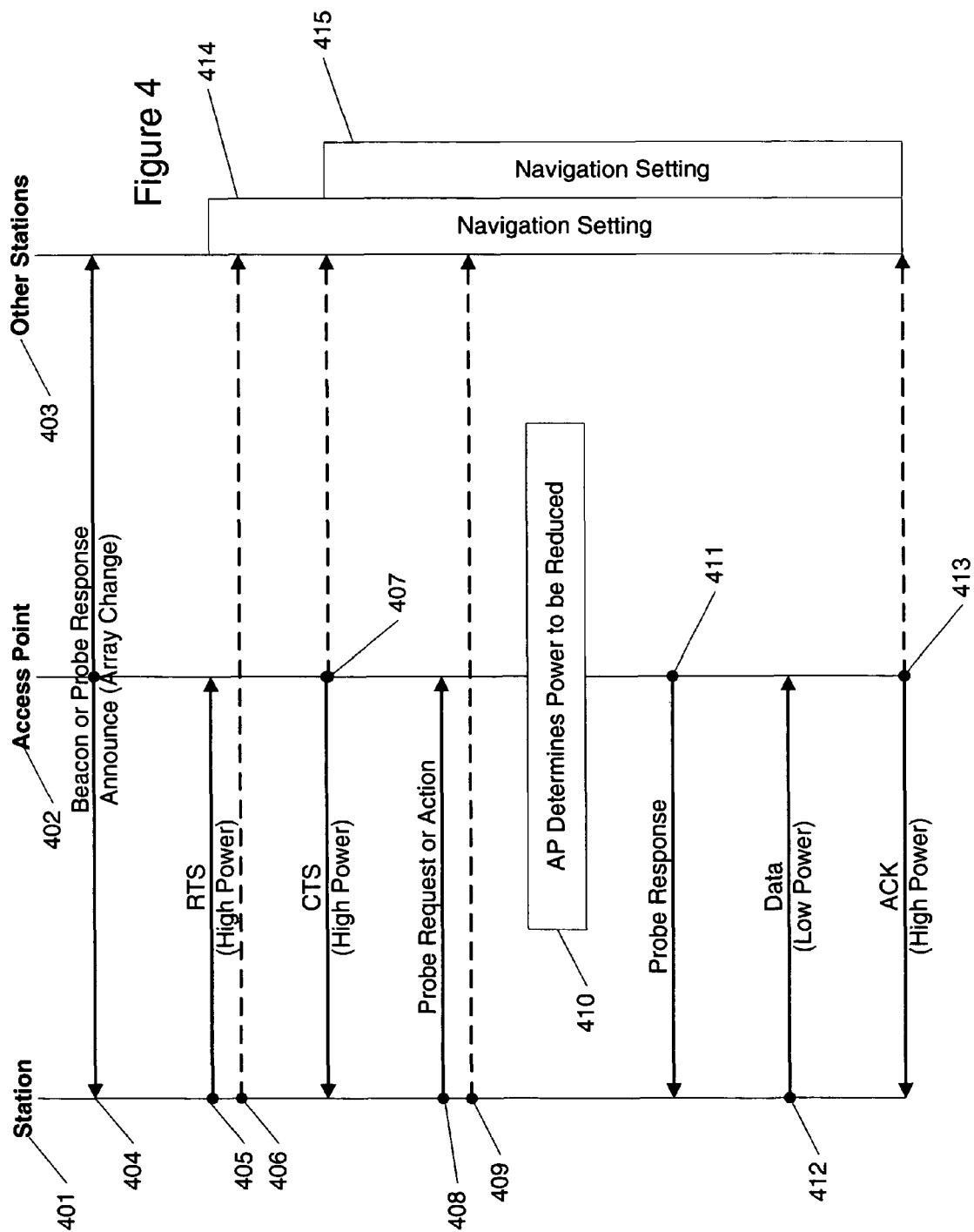

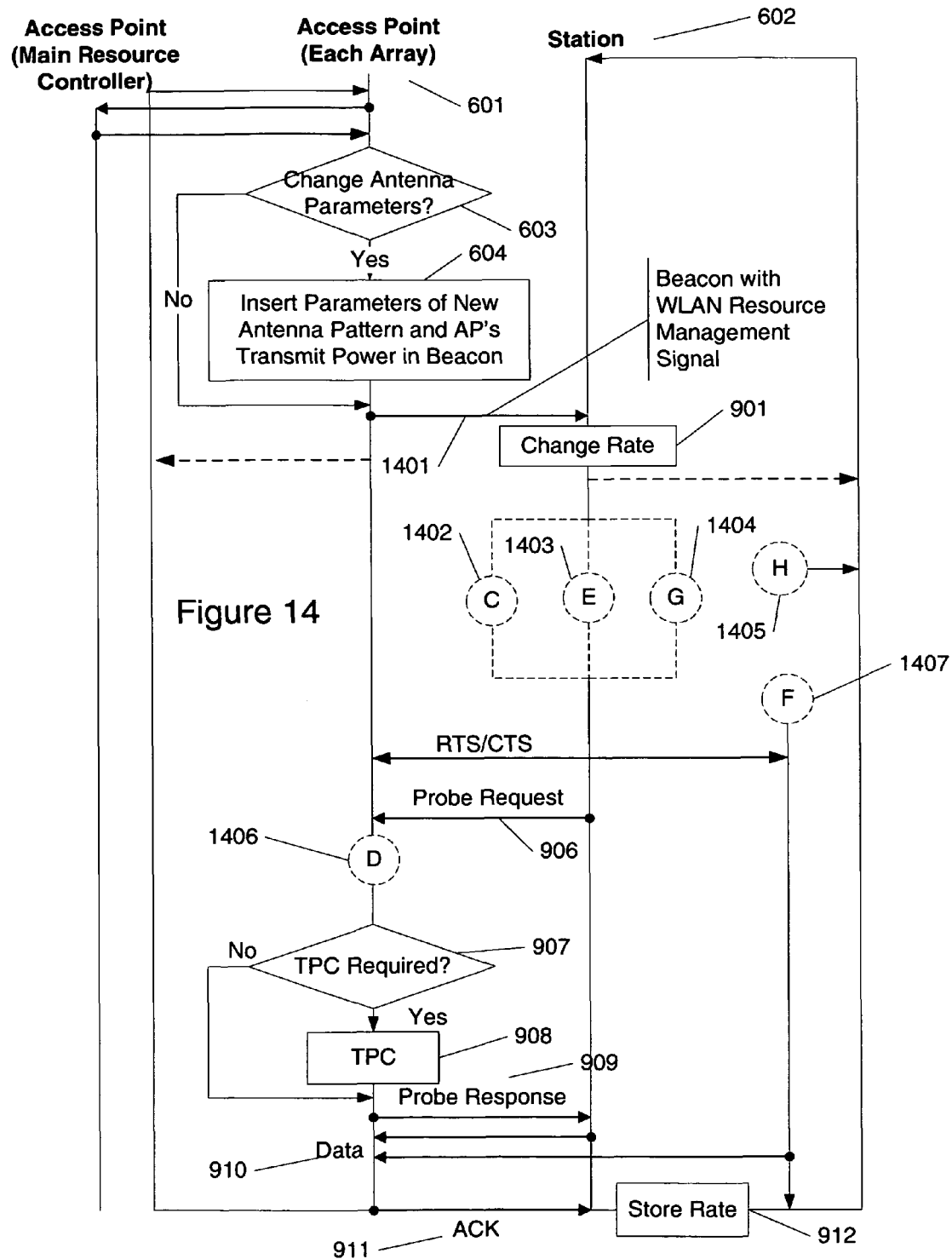

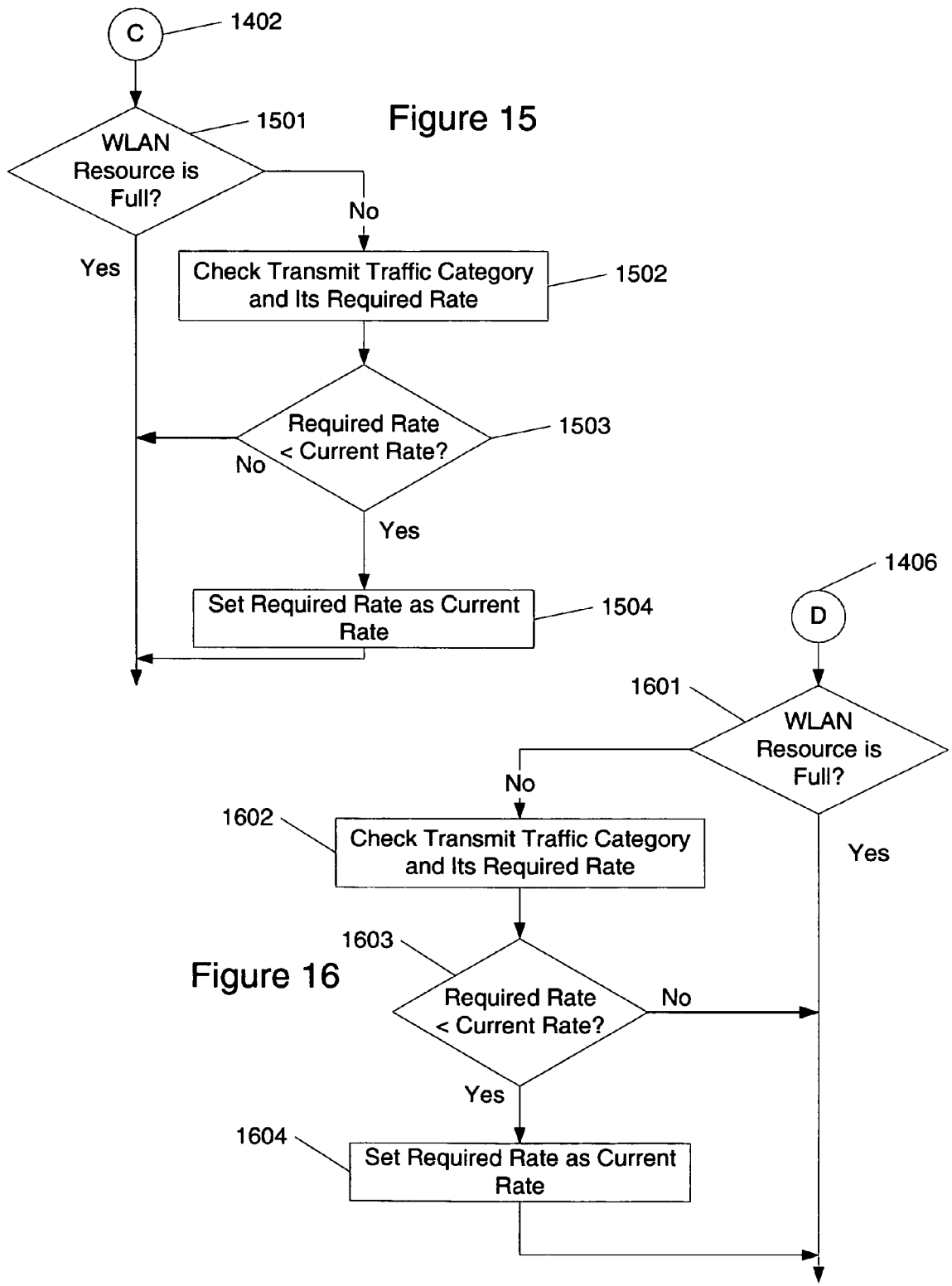

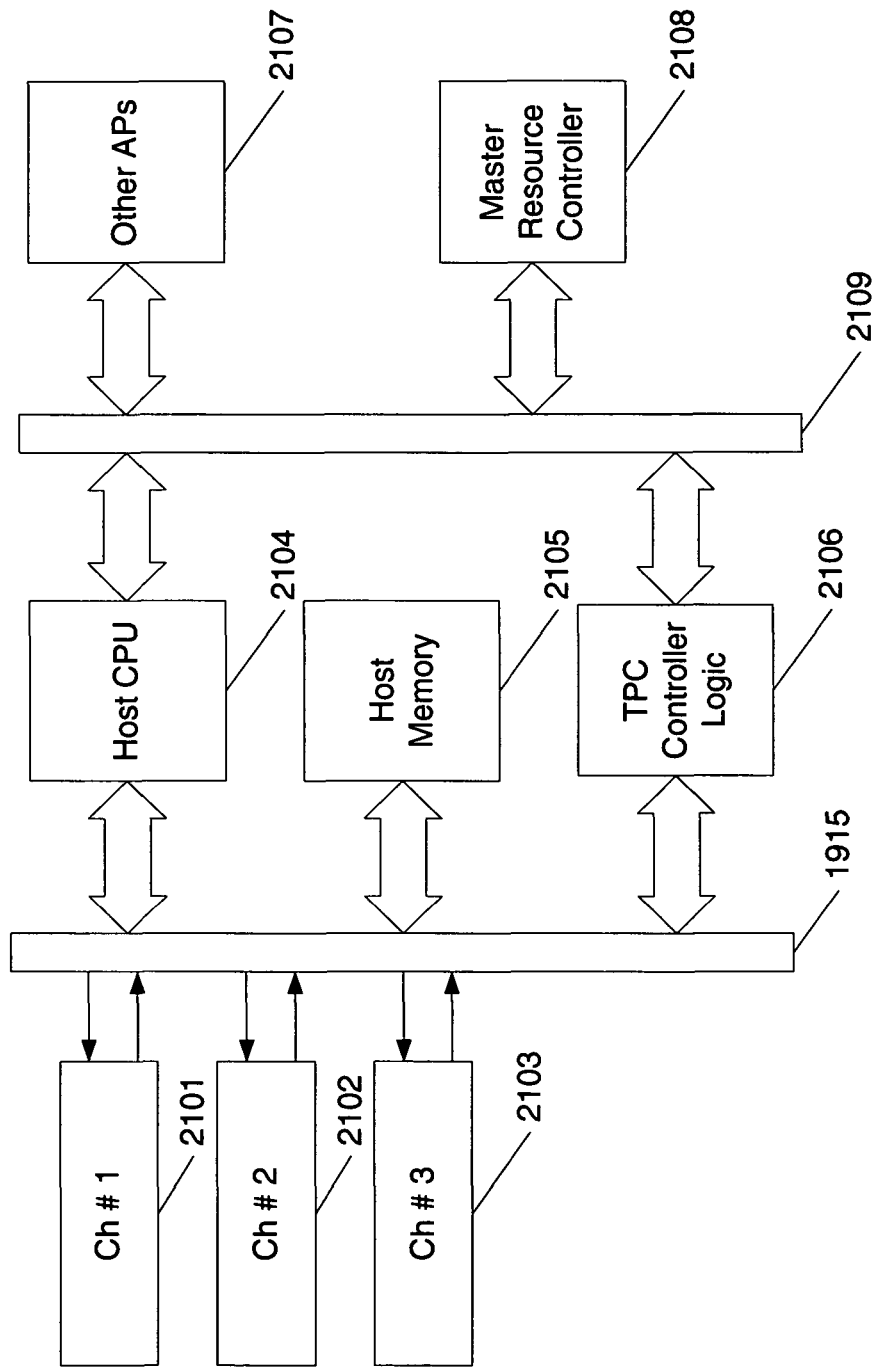

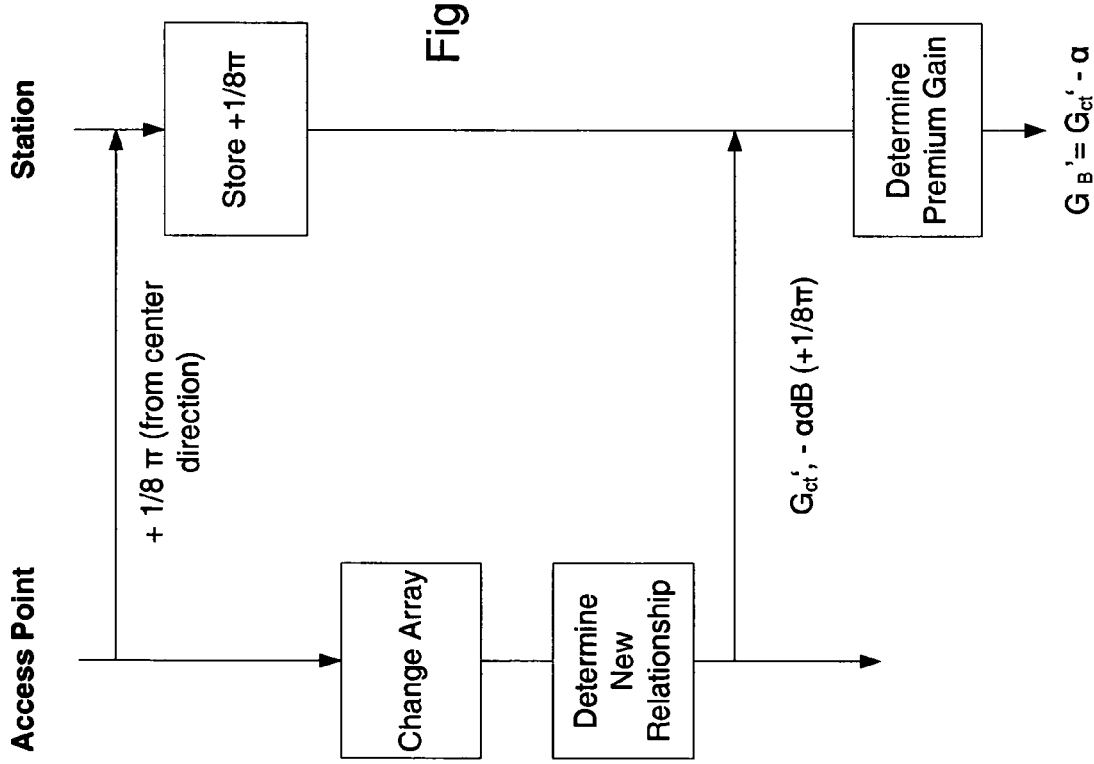

TERMINAL TRANSMIT POWER CONTROL WITH LINK ADAPTATION

TECHNICAL FIELD

Aspects of the present invention relate to wireless communications. More particularly, aspects of the present invention relate to controlling power used to transmit wireless signals.

RELATED ART

The growth of wireless communications and integration with the internet continues to influence the growth of local area networks. Since the expansion of IEEE 802.11-based communication protocols and related devices, wireless local area networks (WLANs) are appearing with regular frequency. WLANs provide high speed wireless connectivity between PCs, PDAs and other equipment in corporate, public and home environments. WLAN users have come to expect access to WLANs and wanting larger coverage areas and higher throughputs. For portable users power consumption concerns are also an issue.

Currently, IEEE 802.11-series protocols are the leading WLAN standards. Some standards (ex: IEEE 802.11 a/b/g) have finished standardization. Some of these standards include the ability to modify power on a link to a unit.

At the same time, wireless providers are experimenting with adaptive antenna arrays (also referred to as smart array antennas). Current approaches to adaptive antenna arrays do not address power control issues. Rather, adaptive arrays concentrate on beam steering techniques.

SUMMARY

Aspects of the present invention address one or more of the issues identified above, thereby providing an improved power control system for use with wireless communications.

BRIEF DESCRIPTION OF DRAWINGS

Aspects of the present invention are described in relation to the following drawings.

FIGS. 3A and 3B show changing array patterns based on packet steering in accordance with aspects of the present invention.

FIG. 4 shows a process for reducing power in accordance with aspects of the present invention.

FIGS. 9-18 show link adaptation in accordance with aspects of the present invention.

FIGS. 20-21 show additional illustrative examples of access points in accordance with aspects of the present invention.

FIG. 22 shows a process for determining premium gain in accordance with aspects of the present invention.

DETAILED DESCRIPTION

Figure 1:
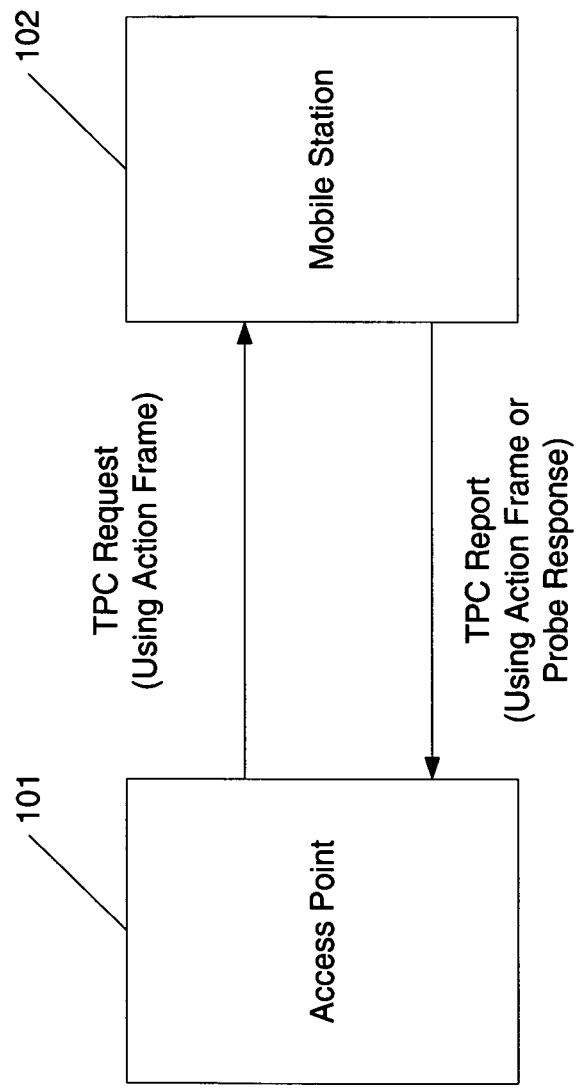
FIG. 1 shows transmit power control in accordance with aspects of the present invention.

Aspects of the present invention relate to controlling power in access points for us with wireless local area networks. The following has been divided into sections to assist the reader: power control; transmit power control in IEEE 802.11h; transmit power control in IEEE 802.11b, 802.11e, and other standards; link adaptation methods; and transmit power control with link adaptation.

It is noted that various connections are set forth between elements in the following description. It is noted that these connections in general and, unless specified otherwise, may be direct or indirect and that this specification is not intended to be limiting in this respect.

Power Control

Aspects of the present invention may be used with non-reciprocal uplink and downlink systems in terms of link gain. For instance, aspects of the present invention may be used with WLAN systems using access points (APs) with smart antennas. Here, aspects of the present invention address at least one of the stations transmit rate but also the stations power consumption. Transmit power control (TPC) capabilities and link adaptation may be used with various environments or expectations. For example, aspects of the present invention may be used in systems where stations transmit with their highest data rate or where stations transmit with their lowest power.

To realize the reduction in power consumption while maintaining usefulness of the system, methods and systems that function with TPC and compliant wireless LAN APs and stations may be used.

Power reduction does not mean that all devices will always be connected to an access point. Rather, hidden terminals exist where every station's transmit power isn't enough to reach every other station or back to an access point. In the 802.11b or 802.11e specification, stations transmit with a constant power and have no TPC functionality. The following describes various approaches to allow TPC in 802.11 protocols.

Transmit Power Control In IEEE 802.11h

IEEE 802.11h is a specification for Europe in 5-GHz band. This specification mainly deals with TPC and Dynamic Frequency Selection (DFS). The primary reason for TPC in 802.11h is that TPC (which means maximum regulatory transmit power setting in 802.11h) is required for operation on a 5 GHz band in Europe. Concerning TPC, 802.11h defines only the frame structure. It describes no method to achieve TPC.

Aspects of the present invention relate to using IEEE 802.11h specification's Probe Request/Response or Action commands to send some TPC information. These features may help other IEEE 802.11 specifications use TPC. These commands may or may not be used to transmit control signals to help avoid any hidden terminals. If control signals are used, they may be set to transmit with normal power to avoid the hidden terminal problem. This may include some modification of both AP and stations. However, aspects of the present invention may use any slot or frame that is reserved in 802.11b/e specification to allow for TPC based on a technique similar to that used with 802.11h.

While both 802.11h and 802.11b have frame structures, they are not identical. The following describes various observations in 802.111h and how to achieve TPC in non-802.11h protocols.

a. For a TPC report, 802.11h changes the Probe response for this operation. While the response is changed, no change is made with the Probe Request to initiate TPC. Rather, 802.11h uses an Action frame for a TPC request.
  i. The same changes in Probe response in 802.11b/e are possible, because an order number that is used for TPC in 802.11h is currently reserved in 802.11b/e.
  ii. In 802.11b, there is no regulation for an Action frame. Thus, it is easier to modify Probe request in this protocol.
  iii. In 802.11e, both an Action frame and a Probe request are defined.
  b. In 802.11h, a station knows that an AP does TPC if a Spectrum Management slot (inside Beacon or Probe response) is set by 1.
    i. The same slot of a Spectrum Management slot is reserved in 802.11b/11e. Aspects of the present invention may use this slot to achieve TPC.

Considering this overview, in 802.11h, TPC may be accomplished as shown in FIG. 1. FIG. 1 shows an access point 101 and a mobile station 102. Transmit power is included in TPC Report from mobile station 102 to access point 101. The TPC Report may be included as part of an Action Frame or part of a Probe Response. This figure shows the situation where the access point 101 wants to adjust a transmit power of mobile station 102. The TPC report is generated in response to a TPC Request from access point 101 to mobile station 102 using an access frame. If mobile station 102 wants to adjust access point 101's transmit power, it may by having reciprocal requests and reports.

However, there is no availability for mobile station 102 to adjust its own transmit power. The current transmit power information for TPC is contained in the Probe response frame. This means that any calculation must be done at a receiver.

Aspects of the present invention include the ability of a mobile station 102 to adjust its own transmit power. The access point 101 may calculate the difference between a current mobile station 102's transmit power, update this information, and forward this information to the mobile station 102.

Transmit Power Control in IEEE 802.11b, 802.11e, and other Standards

To achieve TPC in 802.11 b/e, a minor modification of the slot structure of 802.11h may be used. Various TPC approaches may be constrained by the ability to modify 802.11 b/e protocol's frame structure. The access point 101 and mobile station 102 may also need to be modified to allow for TPC. TPC may be realized as a method of using Probe Request and Probe Response signals. Both types of situations (fixed array and changing array) may be used with TPC. This is shown with respect to FIGS. 2A, 2B, 3A, and 3B.

Figure 2B:
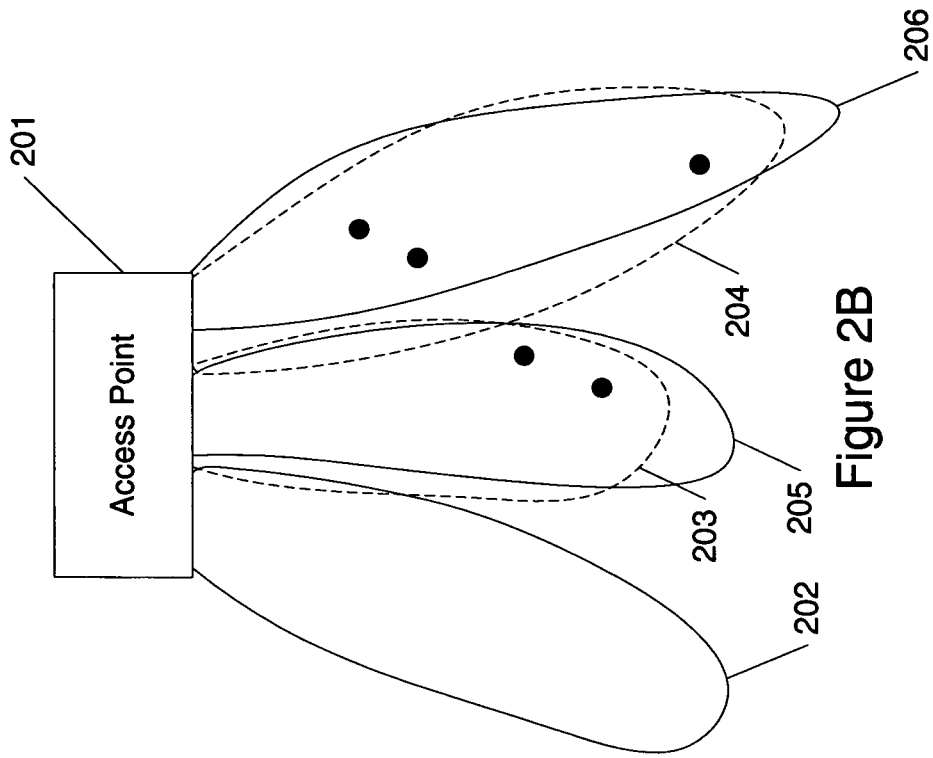
FIGS. 2A and 2B show changing array patterns based on load equalization in accordance with aspects of the present invention.
Figure 2A:
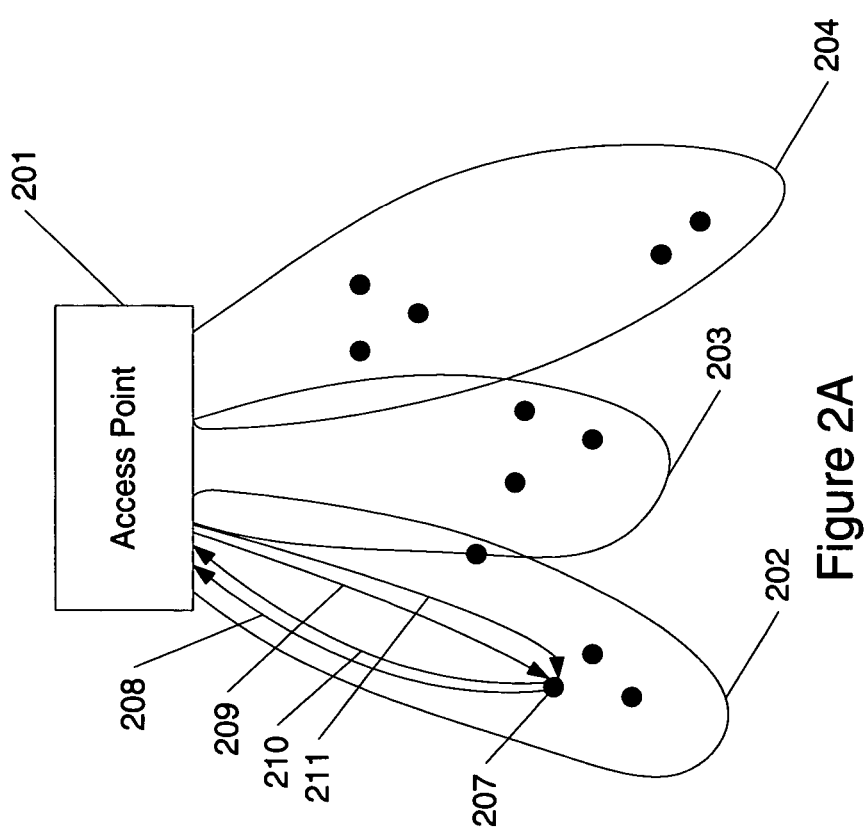

Referring to FIGS. 2A and 2B, TPC is described. Here, station mobile stations know whether the access point 201 changes the various array patterns.
  a. A station 207 sends an RTS (Request to Send) signal 208 to access point 201. A Probe request/response time may be added to a NAV setting timer in the Duration field of the frame. The access point 201 receives the RTS 208 and replies with a CTS (Clear to Send) signal 209 to the mobile station.
  b. The station 207 sends a Probe Request 210 and requests access point 201 to use TPC (for instance, by setting a TPC flag).
  c. The access point 201 detects the received power from the station and determines the value difference between a received power and a power needed to communicate with the access point 201.
  d. The access point 201 sends a Probe Response 211 to the mobile station and informs the mobile station of the value difference.
  e. The mobile station then reduces a transmit power and continues operation as normal.

FIGS. 2A and 2B show transition of coverage areas of an array 201 changing automatically to load equalize each beam.

FIGS. 3A and 3B show transition of coverage areas of an array 301 changing automatically by packet steering.

FIG. 4 shows a signal flow chart between a mobile station 401, an access point 402, and other mobile stations 403. An access point 402 sends a beacon or probe response 404 to announce, for instance, that the antenna beam array associated with access point 402 is going to change. Next, mobile station 401 sends an RTS 405 at high power to access point 402. This may be picked up by other mobile stations 403 as signal 406. Of course, the other mobile stations 403 may or may not be in range to be able to pick up signal 406. Next, access point 402 transmits a CTS signal 407 to mobile station 401. The CTS signal 407 may or may not be received by other mobile stations 403.

Access point 402 may then send a Probe Request or Action signal 408 to access point 402. The same signal may or may not be received by other mobile stations 403 (shown here as broken signal 409. The access point 402 next determines in step 410 the power to be reduced with respect to mobile station 401.

Access point 402 then sends a Probe Response 411 to mobile station 401 that includes the new power setting or the amount by which mobile station 401 may reduce power. Using the new low power setting, mobile station 401 transmits data at signal 412 to access point 402. The access point 402 then acknowledges (ACK signal 413) the receipt of the data. The transmission of signal 413 may be performed at high power to ensure that mobile station 401 knows that the access point 402 has received the data signal 412. Alternatively, ACK signal 413 may be transmitted at low power to save energy at access point 402.

One benefit of transmitting ACK signal 413 at high power is that other stations 403 may then recognize that mobile station 401 has completed transmitting data and now other mobile stations 403 may start the process of transmitting data with access point 402.

Two navigation setting intervals may occur. A first 414 may occur from RTS signal 405 through acknowledgement signal 413. A second 415 may occur from CTS signal 406. through acknowledgement signal 413.

Link Adaptation Methods

The following describes various link adaptation methods in accordance with aspects of the present invention. Here, each station may check a received power and change a data rate according to a received power from an access point. These methods may minimize or eliminate the need to send any control information from/to AP.

Figure 5:
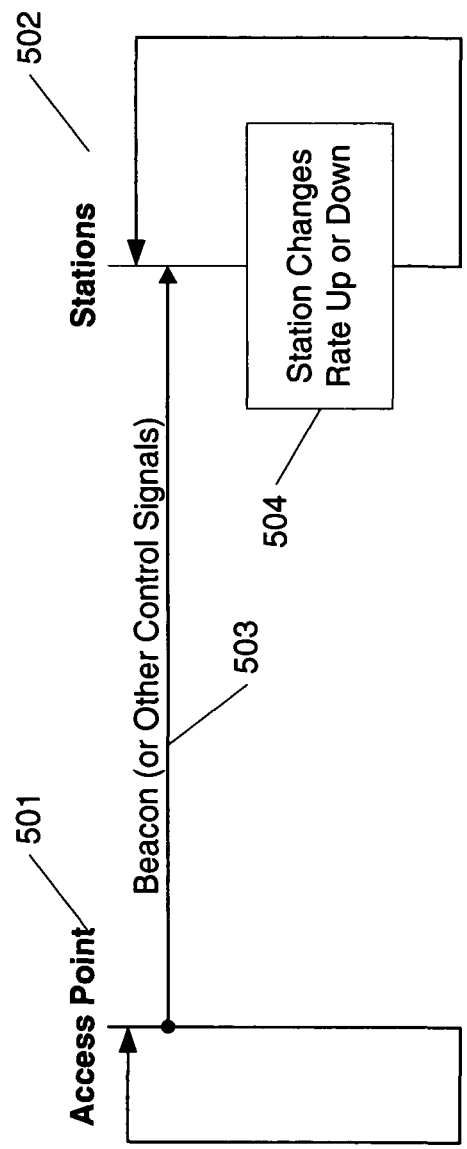
FIG. 5 shows a conventional link adaptation method.

A practical method for link adaptation is not defined in current IEEE 802.11 specifications. Nonetheless, most of the current IEEE 802.11 chipsets or relate equipment perform a type of link adaptation with traditional approaches. Considerations include setting a transfer rate at a highest rate first then decrease it according to channel condition, setting a transfer rate at a lowest rate then increasing it, how often should link adaptation be performed, should a received power and an error detection result be used for link adaptation, and the like. FIG. 5 illustrates a conventional link adaptation method. Each station 502 receives a beacon or control signal 503 from access point 501. The stations 502 may use the beacon or other control signal to determine whether changing power according to the power of the received signal as shown in step 504.

As shown in FIG. 5, these link adaptation methods assume that uplinks and downlinks between access point 501 and stations 502 are reciprocal in terms of link gain. This suggests current approaches to not use smart antennas. This is because, when a system uses an access point with a smart antenna, uplinks and downlinks are not always reciprocal. This is because antenna patterns for receiving is not always the same as that for transmission, especially in packet steering systems as shown in FIG. 3. In addition, link adaptation is currently performed on the supposition that all access points 501 have a constant transmit power in current wireless LAN. However, in the future, access points may not be able to change transmit power using an adaptive array or similar devices to reduce interference. While the link adaptation methods of FIG. 5 may be used with a smart antenna, they will likely be error prone and not provide quality service to users.

Figure 6:
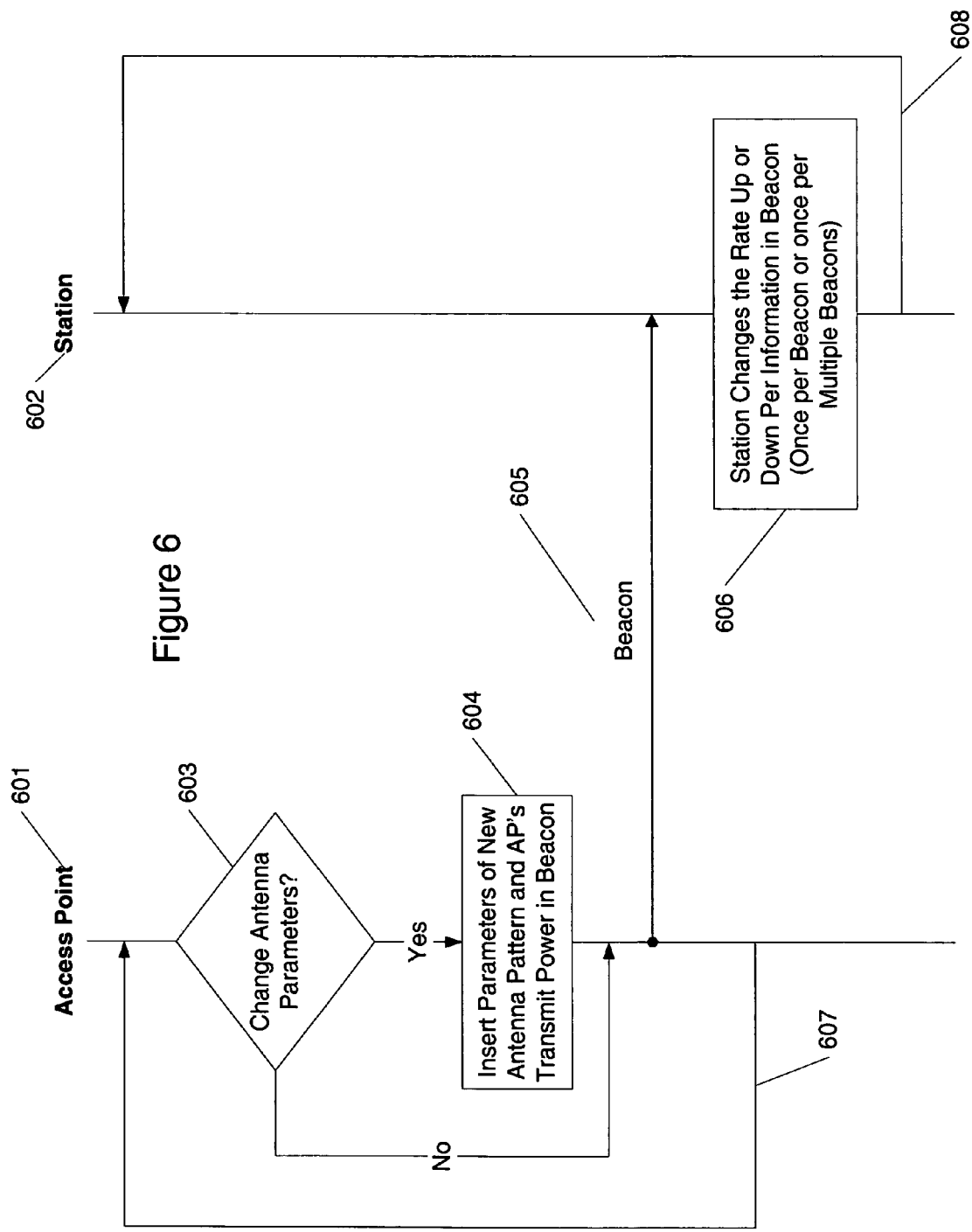
FIGS. 6 and 7 show link adaptation in accordance with aspects of the present invention.
Figure 7:
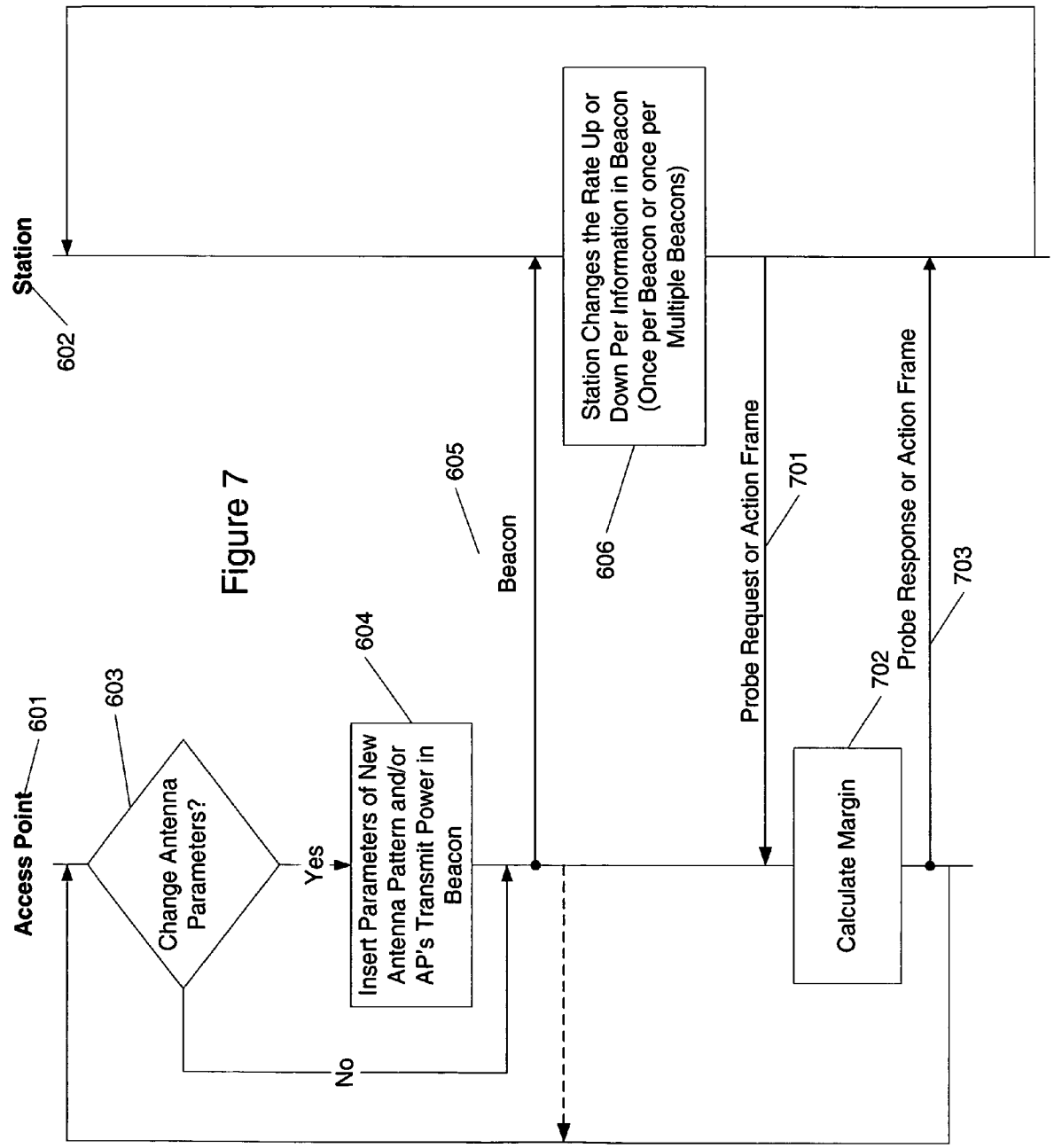

FIGS. 6 and 7 show various link adaptation methods that may be used with a smart antenna in accordance with aspects of the present invention. Referring to FIG. 6, access point 601 determines if it antenna parameters are going to be changed in step 603. If yes from step 603, then the parameters of the new antenna pattern and/or the access point 601's transmit power are inserted into a beacon (or other control signal) 605. If no from step 603, then step 604 is skipped.

Next, the beacon or other control signal 605 is sent to station 602. The station 602 then changes in step 606 its transmission rate up or down according to the information in the beacon (or other signal) 605. The modifications may occur once per beacon or once per multiple beacons. The access point 601 and station 602 then wait (paths 607 and 608, respectively) for a next transmission of the beacon or other signal 605. Also link adaptation may be performed with the transmission of every beacon signal, may be done periodically, or may only be performed when the antenna parameters change.

Antenna parameters may be, for example, the gain difference between transmit beam and receive beam. This may be applicable in a system that uses packet steering as the transmit beams are wide to cover a larger area.

FIG. 7 shows an approach in which an access point 601 only sends only sends change antenna parameter information or change AP's transmit power information (inserted in step 604) in the beacon 605. The station may then change the rate up or down per information in the beacon (occurring once per beacon or once per multiple beacons). Each station 602, which receives beacon 605 with any change information, sends a Probe request or Action frame 701 to request power control information from access point 601. The access point 601 then calculates in step 702 the margin or gain difference between a transmit beam and a received beam. Next, access point 601 sends the gain difference or margin in a Probe Response or Action frame 703 to station 602. Alternatively or additionally, access point 601 may send its transmit power using the Probe Response or Action Frame 703 to station 602.

Figure 8:
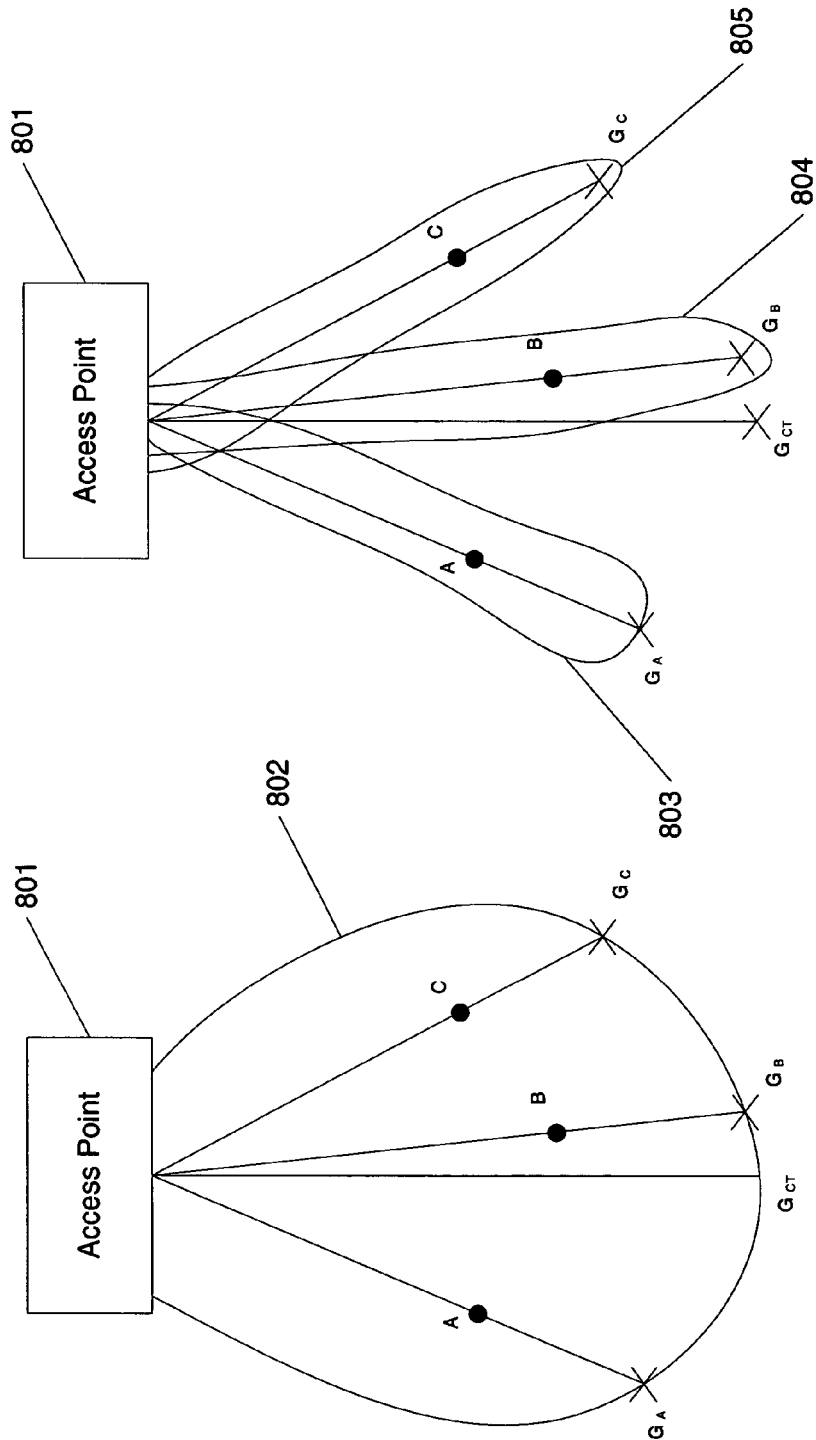
FIGS. 8A and 8B show modifications of antenna parameters in accordance with aspects of the present invention.

FIGS. 8A and 8B show examples of antenna parameters used in packet steering. In general, for both wide beam 802 ($G_A$, $G_B$, $G_C$) and sharp beams 803-805 ($G_A'$, $G_B'$, $G_C'$) from access point 801, antenna parameters are different according to the azimuth ($G_A \neq G_B \neq G_C$, $G_A' \neq G_B' \neq G_C'$) for stations A-C. However, access point 801 may be limited as not being able to accommodate all these differences when it sends antenna parameters to all stations (as represented in FIGS. 6 and 7. Two approaches are described that address the situation where less than all antenna parameters are forwarded (including but not limited to no antenna parameters) to all stations with Beacon 605.

In a first approach, access point 801 calculates and informs the minimum gain difference (($\delta G)_{min}$) as antenna parameters. Access point 801 next sends control information with the wide beam ($G_A$, $G_B$, $G_C$) 802 and receives each station's signal with the sharp beam ($G_A'$, $G_B'$, $G_C'$) 803-805. ($\delta G)_{min}$ may be represented by the following equations:

$$(\delta G)_{min} = \text{Min}[(G_A'-G_A),(G_B'-G_B),(G_C'-G_C)] \quad \text{Eq. (1)}$$

or $$(\delta G)_{min} = \text{Min}[G_A', G_B', G_C'] - \text{Max}[G_A, G_B, G_C] \quad \text{Eq. (2)}$$

This method is easy to implement. However, not every station may achieve an individual optimum gain with this approach. The process for the equations is shown in FIG. 22.

In a second approach, access point 801 knows a direction of each station and sends this information to each station in advance. Each station A-C memorizes or stores the direction information. Next, when access point 801 changes its antenna radiation pattern, access point 801 calculates the relationship between antenna directivity and a radiation characteristic, and send this information to stations as an estimated radiation characteristic of antenna beam (or beam pattern). Stations A-C receive this information and calculate a premium gain by using the new beam using current condition and an estimated radiation characteristic of antenna beam.

For example, as shown in FIGS. 8A and 8B, access point 801 decides a center direction $G_{ct}$. Station B, for instance, received information from access point 801 that an angular direction between the center $G_{ct}$ and station B is $+\frac{1}{8}\pi$. Next, access point 801 changes the antenna radiation pattern and sends the stations A-C information relating to the current center gain is $G_{ct}'$ dB. Transmitted with this information or transmitted separately is an indication that a gain of direction $+\frac{1}{8}\pi$ it is $\alpha$ dB smaller than that of the center direction. Station B receives and adjusts its antenna parameter as $(G_{ct}' - \alpha)$ dB.

Generally, each station has some information about the relationship between received power and affordable transmit rate to be used for link adaptation. If a station complies with one of the above link adaptation methods, it may modify a received power using the following equation:

$$\text{Received power} = \text{actual received power} + \text{antenna parameter} \quad \text{Eq. (3)}$$

Then, if the case that an access point 801 changes its power, stations may need received power and transmit rates and the transmit power of access point 801 to perform link adaptation as described above.

Tables 1 and 2 show various relationships between transmit power, received power, and data rates tables. Using information similar to that shown in table 1, stations may adjust their power to achieve a useful transfer rate.

TABLE (1)

| Transmit power | Receive power | Rate |
|---|---|---|
| −15 | −84 | 11 Mb/s |
| −15 | −87 | 7 Mb/s |
| ⋮ | ⋮ | ⋮ |

TABLE (2)

| Power loss<br>(= Transmit power − Receive power) | Rate |
|---|---|
| : | 11 Mb/s |
| : | 7 Mb/s |
| : | |
| : | |

Transmit Power Control with Link Adaptation

TPC and link adaptation may be used together as a systematic control, because both of them use a received power level of station. Both methods may be combined based on different priorities or adopted policies for TPC.

The following lists various possible policies for TPC methods with combined link adaptation:
- a. A first policy emphasizes data throughput
  - i. Each station transmits with as high rate as link adaptation permits.
  - ii. Stations transmit with a constant rate. For example, if an access point restricts an acceptable rate as 11 Mb/s and station's current rate is not 11 Mb/s, then that station does not transmit or it changes its rate into 11 Mb/s.
- b. A second policy emphasizes power conservation
  - i. If all stations emphasize only power, sometimes some stations may transmit at a much lower data rate than link adaptation permits. This may adversely affect other stations. In this policy assumes that all stations are able to handle a lowest data rate.
- c. A third policy emphasizes data rates based on a networks condition
  - i. When a network is not crowded, each station emphasizes TPC.
  - ii. When the network is crowded, each station emphasizes throughput.
    1. Each station transmits with the maximum rate or
    2. The access point sets the minimum rate and prohibits any station from transmitting with lower rate than the minimum rate.

Next, a TPC interval performed by a station is related to system throughput as well as control complexity. The following three situations are considered:
- a. TPC is performed at every station's signal sending opportunity
- b. TPC messaging is reduced using the following two considerations:
  - i. TPC level from access point is calculated with sufficient fading margin to maintain a link during the TPC message interval. Alternatively, TPC level is calculated with sufficient margin to maintain the link even if the access point changes its array pattern.
  - ii. Access point informs a station that access point's antenna directivity or other radiation characteristics are changed whenever it is required by a station. When the change does not occur, TPC is not required.
- c. TPC messaging is reduced using only the following:
  - i. TPC level from access point is calculated with sufficient fading margin to maintain a link during the TPC message interval. Alternatively, TPC level is calculated with sufficient margin to maintain the link even if the access point changes its array pattern.

The combinations of control policies and message frequency for TPC are shown in the following table 3. Various examples are shown in the following figures as well. The examples described herein include examples 1-9. The number in the following table shows the example number to which it corresponds.

TABLE (3)

| Method/<br>Policy | Required Rate is<br>calculated at . . . | TPC on<br>Every Sending<br>Opportunity | Reduce<br>Frequency of<br>TPC Message<br>Using i.<br>and ii. | Using<br>only i. |
|---|---|---|---|---|
| Emphasis on Throughput | | 1 | 2 | 3 |
| Emphasis on Transmit Power Reduction | Station | | | 4 |
| | Access Point | | | 5 |
| Emphasis on WLAN Resource Management | Station | 6 | | |
| | Access Point | 7 and 9* | | 8 |

*where the access point restricts the minimum required rate

EXAMPLE 1

FIG. 4 shows this first example. Here, each station 401 or 403 performs link adaptation using one of the methods described above. Then, when station 401 wants to send its data, station 401 performs TPC as shown in FIG. 4.

FIG. 4 shows the case which satisfies the Distributed Coordination Function (DCF) operation of the IEEE 802.11 specification. However, it may also be used with a modification of the Point Coordination Function (PCF) operation of IEEE 802.11, Enhanced Distributed Channel Access (EDCA) operation and Hybrid Coordination Function (HCF) operation of IEEE 802.11e specification.

In the case of EDCA, the method is similar to that of DCF. One difference for TPC between DCF and EDCA is that Block ACK mode exists in EDCA. In the Block ACK mode, ADDBA request/ADDBA response commands are used instead of RTS/CTS and they can replace RTS/CTS in FIG. 4. Additionally, ADDBA request/ADDBA response have several reserve bits, so one may enclose TPC request and response signals to the reserve bits. In this alternative approach, one does not need to use the Probe request/response or Action frame to transmit the power to be reduced.

In cases of PCF or HCF, a Point Coordinator (PC) (Hybrid Coordinator (HC) in 802.11e) controls these signals. The PC (HC) may be located in an access point. The PCF scheme may be initiated by stations requesting that the PC (HC) registers them on a polling list, and the PC (HC) then regularly polls the stations for traffic while also delivering traffic to the stations. Stations may be controlled by the PC (HC) and allows transmitting one (or several) frame(s) for each polling signal from PC (HC). (See IEEE 802.11 specification.)

Thus, in PCF (HCF), a station should enclose TPC requests in DATA+CF ACK frames and PC (HC) should enclose TPC responses in DATA+CF Poll frames. Currently, slots for address 4 are N/A in 802.11/802.11e (according the specification, this is for the case of transmit between an access point and another access point). It can be used for the TPC signals as described herein. Alternatively, any other reserved slots can be used. One may also use RTS/CTS.

In future specifications, some or all of the modes will generally be backwards compatible and interoperable with IEEE 802.11 a/b/g. Thus, the TPC and link adaptation described herein may likely suit every standard in the 802.11 family.

To enable TPC, the access point may use tables showing transmission rate and required received power levels to maintain a link with specified rate. Most stations have such tables to perform link adaptation. Table 4-1 and 4-2 are the sample tables. "b" is a variable that represents the required power for 11 Mb/s. Here for example, a station sending a signal with 11 Mb/s and its received power is (b+4) dBm. The access point checks and knows from the table that the required rate 11 Mb/s needs b dBm power. Thus, the access point tells the mobile station to reduce power by 4 dB. In response, the station reduces its transmit power by 4 dB.

TABLE (4-1)

| Rate | Required Received Power (dBm) |
|---|---|
| 11 | b |
| 5 | b − 3 |
| 2 | b − 6 |
| 1 | b − 9 |

TABLE (4-2)

| Rate (Mb/s) | Required Received Power (dBm) |
|---|---|
| 11 | b |
| 5.5 | b − 3 |
| 2 | b − 4 |
| 1 | b − 7 |

EXAMPLE 2

Example 2 shows a example where the system attempts to reduce the frequency of TPC message exchange. Two approaches are described with respect.

In a first approach with an access point 601 and a station 602, the station 602 examines whether access point 601 has changed its antenna radiation pattern or other characteristic at every transit opportunity. When the access point 601 uses a smart antenna (adaptive antenna) and changes its array width, for instance, reception conditions of station 602 are also changed. Thus, station 602 inquires whether a change has occurred. If a change has occurred, the station invokes TPC.

This approach also applies where access point 601 changes its transmit power for other reasons. Stations 602 with antenna parameter signals can respond where an access point 601 changes its condition more precisely. If an access point 601 changes an array width or transmits power on a large scale and, if link adaptation is done only at every several control signals, for instance, the rate which is changed by link adaptation may not be updated as well as it should be. Thus, under this condition, having an antenna parameter is useful.

In a second approach, TPC is described with an additional control margin to reduce its frequency. This margin is set so that a usual fading depth by typical multi-path and shadowing are impacted by a little change of an antenna parameter. Here, when the antenna parameters do not exceed the margin, the station does not need TPC at every transmission time.

This second approach has two advantages. First, this approach may reduce the transmission of additional signals being transmitted only for TPC between a station and an access point. One reason why decreasing the frequency of transmission of signals only for TPC is because redundant signals waste bandwidth. This may also be referred to as throughput degradation. This is noticeable in the situations that use RTS/CTS. (See Table 5.) One may use reserved slots in RTS/CTS for TPC. However, the maximum reserved slots are 3 bits only in RTS/CTS slots in the current 802.11 standard. These 3 bits may not be enough to inform the power value to be reduced with a sufficient range and accuracy.

Second, this approach provides advantages for channel conditions between access points and stations that are not changed and where the station (or access point) wants to send signals almost constantly (like voice etc). The reduction of unnecessary processing for TPC can avoid dissipating signal processing resources as well as consuming power.

Figure 9:
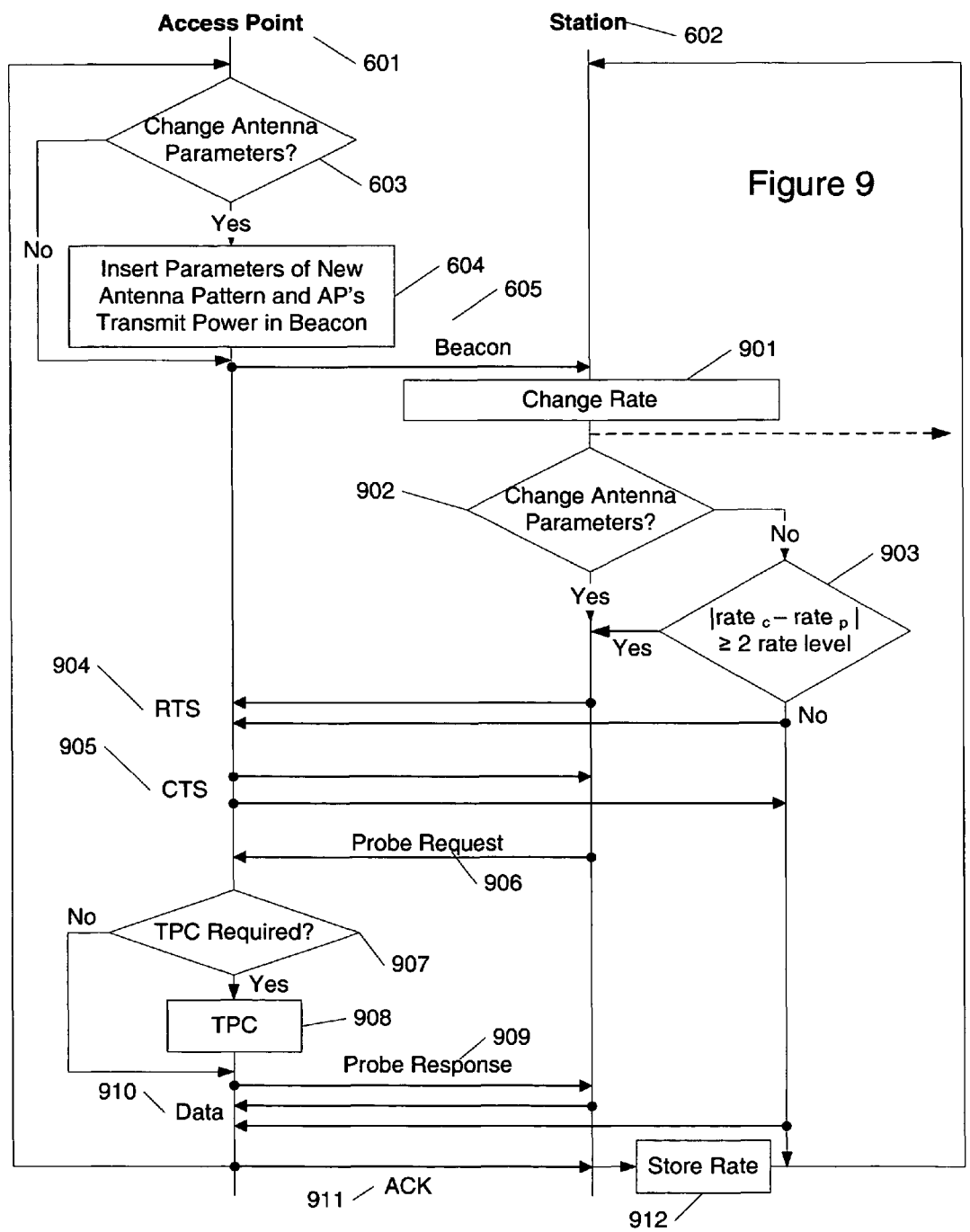

FIG. 9 shows the flow chart of the latter example. When a station 602 wants to send data, the station changes a rate in step 901 and checks to see if antenna parameters have changed in step 902. If an antenna parameter signal changes, then the station 602 determines if a TPC change is required. Here, the TPC change includes RTS signals 904, CTS signals 905, a probe request 906, and a determination if TPC is required (step 907). Here, the access point 601 checks the received rate and power of the signal and determines if TPC is needed.

If TPC is required then it is performed in step 908 and the information transmitted between the station 602 and access point 601 using a probe response 909, data signals 910, and ACK 911. If no TPC is required, then the process steps to probe response, data and ACK signals 909-911. Finally the new rate is stored in step 912.

If there was no change in antenna parameters from step 902, then the stations 602 determines if the difference of rate or/and power between a current rate ($rate_c$) and a previous rate ($rate_p$) is greater than 2 times the rate level in step 903. It is noted that power information may be used in conjunction or in place of the rate information.

If yes from step 903, then the system proceeds as above. If no, the system begins a new cycle.

In step 907, the access point 601 calculates the value of a difference based on the signal data and a margin information which may be taken from the tables shown for instance as Tables 4-1 and 4-2. For example, using Table 4-1, when the received rate is 2 Mb/s (required power is (b−6)), access point 601 calculates the difference between received power and required power for transmission at rate 5.5 Mb/s, which is one-level higher than current rate, and required power at this rate is (b−m3). In this case, the value of difference is "received power—(b−3)". This 3 dB is the margin. The margin level in this example is 1 level, but it can be changed according to a control policy. Also, if Table 4-2 is used, the power difference between rates 2 Mb/s and 5.5 Mb/s is little and it is possible to group them together in such a case.

TABLE (5)

| Signal | Total Length (MAC header length) |
|---|---|
| RTS | |
| CTS/ACK | 14 octets (10 octets) |
| DATA | 34 + 0~2312 octets |
| | (30 octets) |
| Management frame | 28 + 0~2312 octets |
| (Beacon, Probe Request/response) | (24 octets) |

EXAMPLE 3

Figure 10:
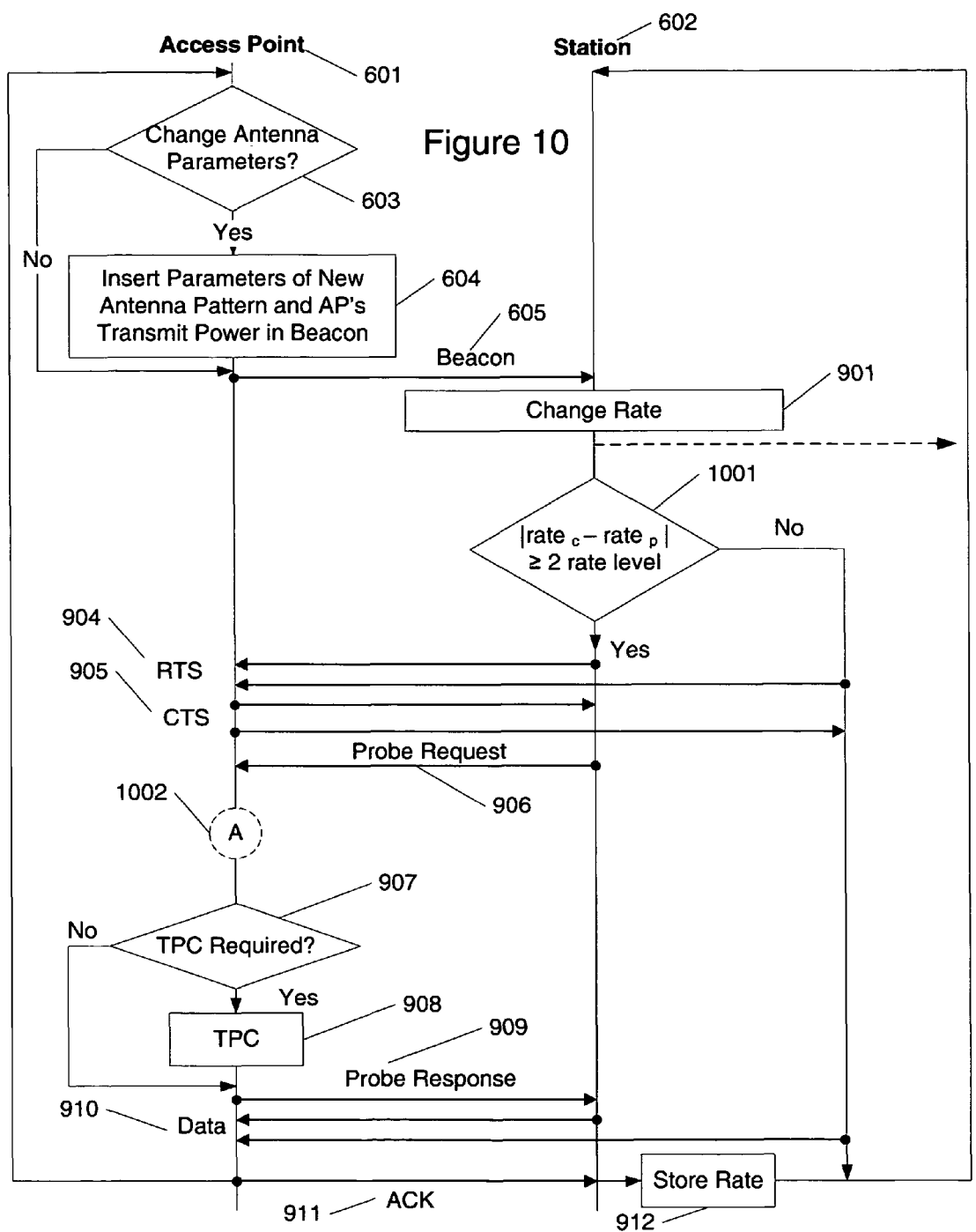

FIG. 10 a signal flow chart for example 3. The approach of Example 3 is similar to that of Example 2. However, step 903 is performed as step 1001 in place of step 902. Here, station 602 does not check a change in antenna parameters. This is because, if access point 601 array changes, the influence is reflected in the received power and transmission rate using link adaptation. In this example, the station 602 does not need to check for a change in antenna parameters of access point 601 prior to performing TPC. One advantage of the system of Example 3 is that is may be easier to implement than that of Example 2.

Example 3 may be useful under one or more of the following conditions:

Where access point 601 rarely changes its antenna radiation pattern or other characteristics, or where these changes are too small to effect stations 602.

Station 602 performs link adaptation by comparing its frequency of TPC with the frequency of access point's 601 frequency of the changing its antenna parameters, or station 602 performs link adaptation as soon as it receives a new antenna parameter of access point 601.

The following examples are described with respect to one of the above approaches. For the following examples, one may substitute steps 902-903 with step 1001 as well as step 1001 with steps 902-903 for the reasons specified above.

EXAMPLE 4

Figure 11:
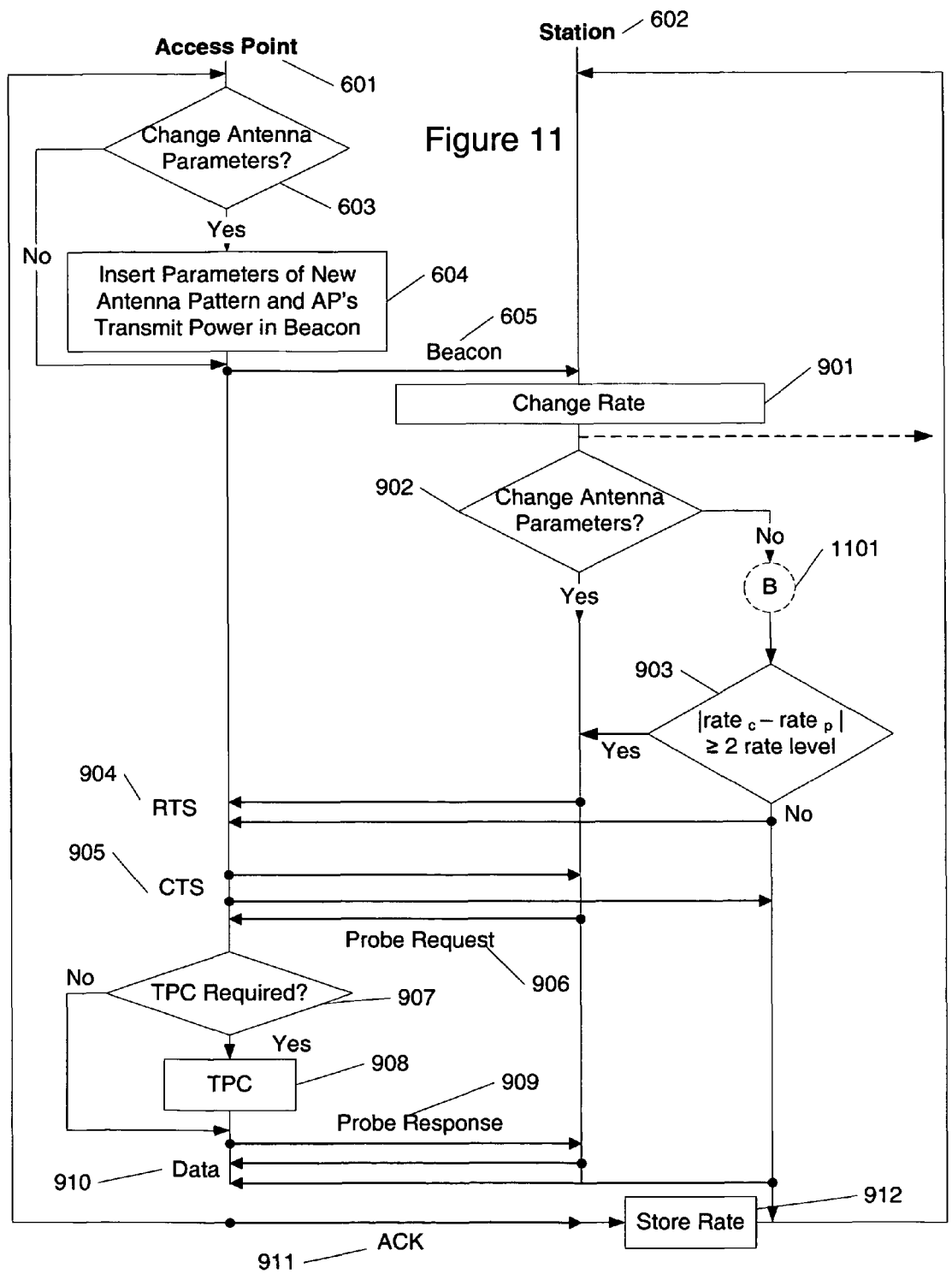

FIG. 11 shows an approach used by Example 4. Example 4 represents an approach where a policy provides an emphasis on power restriction. Here, each station 602 calculates a required rate before transmission.

Figure 12:
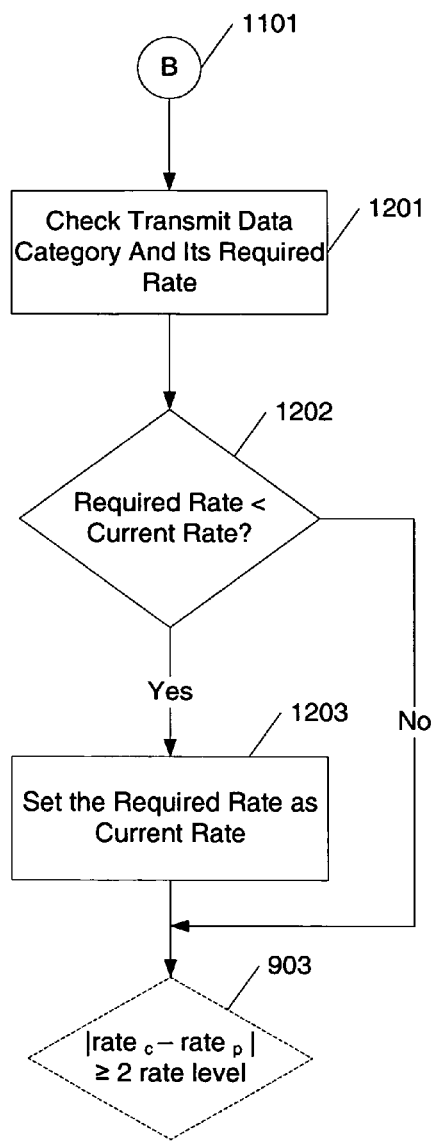

When station 602 wants to send a payload, it checks a transmit payload category according to traffic or content and its required rate using table like that shown in Table 6 below, for instance. A margin may be set at an access point 601 as shown in FIG. 11. FIG. 11 is similar to that of FIG. 9. However, if no from step 902, then the process steps to point B 1101. Point B continues at FIG. 12.

In step 1201, the station 602 checks the data transmit category and its required rate. Various rates are shown in Table 6. In step 1202, the station 602 checks to see if the required rate is less than the current rate. If yes, then in step 1203, the system sets the required rate as the current rate. If no from step 1202, then the process continues with step 903 where station 602 checks to see if TPC is needed with or without a margin.

For example, using Table 6, if the transmit data category is "voice" (the required rate being 2 Mb/s according to this table) and current rate is 7 Mb/s, station updates the rate to 2 Mb/s. The advantage of this case is that each station can transmit with sufficiently high rate for desired traffic or content and lower power.

The values used shown in Table 6 are for example purposes only. They may be altered based on system preferences.

Station 602 can use antenna parameter change information for examination as shown in Example 2. The process at the access point 601 is the same as that of Examples 2 and 3.

TABLE (6)

| Traffic Category | Rate (Mb/s) |
|---|---|
| Video | 11 |
| Photo | 5.5 |
| Voice | 2 |
| Best Effort | 1 |

EXAMPLE 5

Figure 13:
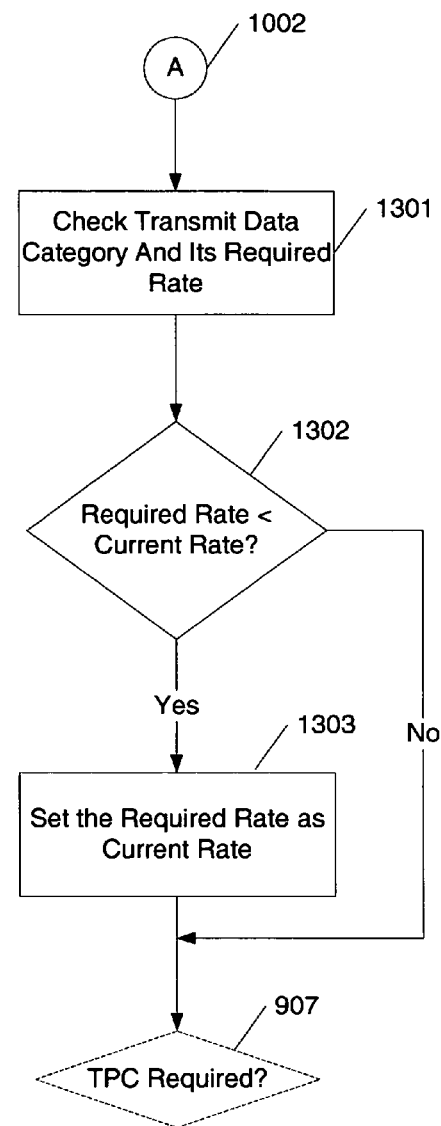

Example 5 is shown with respect to FIGS. 10 and 13. Example 5 is similar to that of Example 4 but where the required by the access point 601. The calculation begins at point A 1002 in FIG. 10 and continues with FIG. 13. At step 1301, the system checks the required rate and the current rate at access point 601. In step 1302, the access point 601 determines if the current rate is larger than the required rate. If yes, then the process steps to 1303 where the current rate is set to the required rate. Next, the access point 601 determines if TPC is required in step 907. If no from step 1302, then the process continues with step 907.

One advantage is that station 602 does not need to have Table 6. Also, station 602 is not required to set the appropriate rate. This example may be beneficial where station 602 is desired to have less processing functions so as to minimize power consumption for the station 602. However, in this example, the access point 601 needs to send not only a value difference but also rate information. Current Probe response or similar signals can be used to send both power and rate with a little modification.

Table 7 shows a sample of a table that may be used with Example 6. "b" shows the required power for 2 Mb/s. In this case, access point 601 has both traffic category-rate and rate-required power information. Station 602 may or may not use an antenna parameter for examination like that shown in Example 2. Because this process is shown in FIG. 9, it is not shown in FIG. 11 (but is considered within the scope of this example).

TABLE (7)

| Traffic Category | Rate | Required Terminal Transmit Power (dB) |
|---|---|---|
| Video | 11 | b + 8 |
| Photo | 5.5 | b + 4 |
| Voice | 2 | b |
| Best Effort | 1 | b − 3 |

EXAMPLE 6

The policy for Example 6 is an emphasis on WLAN management. Here "WLAN resource" means how much wireless resource of access point 601 is occupied. It mainly depends on a number of stations which have payload to transmit/receive in each AP or in each array, a size of load from/to each station and so on. Note that AP sends a binary signal as "WLAN resource management signal" in this figure but any other signals can be also used. For example, "Station Count" and "Channel Utilization" signals are defined as a Beacon by IEEE 802.11e specification and we can use these signals as WLAN resource management signal. Here, "Station Count" indicates a total number of stations currently associated in each AP (or array), and "Channel Utilization" indicates a percentage of time AP (or array) senses the medium busy, as indicated by either physical or virtual carrier sense mechanism. In these cases, AP or stations sets a threshold. If the value of these signals becomes larger than the threshold, AP or stations consider the WLAN resource to be full. When stations examine whether the value becomes larger than the threshold, AP sends the value of threshold signal to station in advance. For example, if the maximum number of VoIP stations in each AP (or array) is x+2, AP sets the threshold x−1, and the current number of VoIP stations is x, AP or station consider the WLAN resource to be full.

FIGS. 14 and 15 show the flow chart for example 6. Points C 1402, E 1403, and G 1404 are shown in parallel to reflect the various actions that may be taken with respect to Example 6 and other examples described below.

When the process of FIG. 14 steps to point C 1402, the process continues in FIG. 15. In step 1501, the system determines if the WLAN resource is full. If yes, then the process returns to FIG. 14 and continues with the RTS/CTS signals. If no from step 1501, the system checks the transmit traffic category and its required rate in step 1502. Next, in step 1503, if the required rate is less than the current rate then the process continues with step 1504, where the required rate is set as the current rate. Otherwise, from step 1503 the process continues with the RTS/CTS signals of FIG. 14.

Here, each array in an access point sends resource information to a master resource controller in the access point or in a backbone network. Next. A master resource controller examines the WLAN resource considering information from all arrays, and sends this result to each array. It is also possible that each array examines WLAN resource associated with itself. The same scheme can be used even if AP is not a smart antenna and only has one array.

The AP may send WLAN resource information with control signals like the Beacon. Then, station considers modifying the rate considering WLAN resource. If this WLAN resource is full, each station sends signals at its maximum rate. However, if WLAN resource is not full, each station is not needed to send with its maximum power. In such case, station updates the rate into the required rate shown in Table 7 shown above to reduce the power consumption.

EXAMPLE 7

Example 7 relates to where the AP calculates a transmit rate for each station considering the WLAN resource. FIGS. 14 and 16 provide a flowchart for this example.

The process of FIG. 14 includes changing the rate in step 901 then processing the RTS/CTS signals. After probe request 906 and encountering point C 1406, the process continues with FIG. 16. In FIG. 16, the AP determines if the WLAN resource is full. If no, then the system checks a transmit traffic category and its required rate in step 1602. In step 1603 the AP determines if the required rate is less than the current rate. If yes from step 1603, then the AP sets the required rate as the current rate in step 1604. Next, the process continues with step 907. If yes from step 1601 or no from step 1603, then the process continues with step 907 as well.

Here, a station requires TPC at every transmission in these figures but the station may function with only a sparser interval. When the station requires TPC, the AP calculates the value of difference. If WLAN resource is not full, it also calculates a transmit rate for each station. The advantages of this approach includes the station does not need to do WLAN load examination as well as to calculate the transmit rate.

Here, the WLAN load information is used for control. Of course, other relevant information may also be available to achieve control with an emphasis on WLAN resource management.

Optionally, it is possible to combine the flow charts of FIGS. 14, 15 and 16. In this optional combination, the WLAN resource is examined by the station and the AP. In this combinational approach, if a station misunderstands a WLAN and sends data at a low rate even though the resource is at full power, the AP also may examine the resource and modify the power accordingly.

EXAMPLE 8

Figure 17:
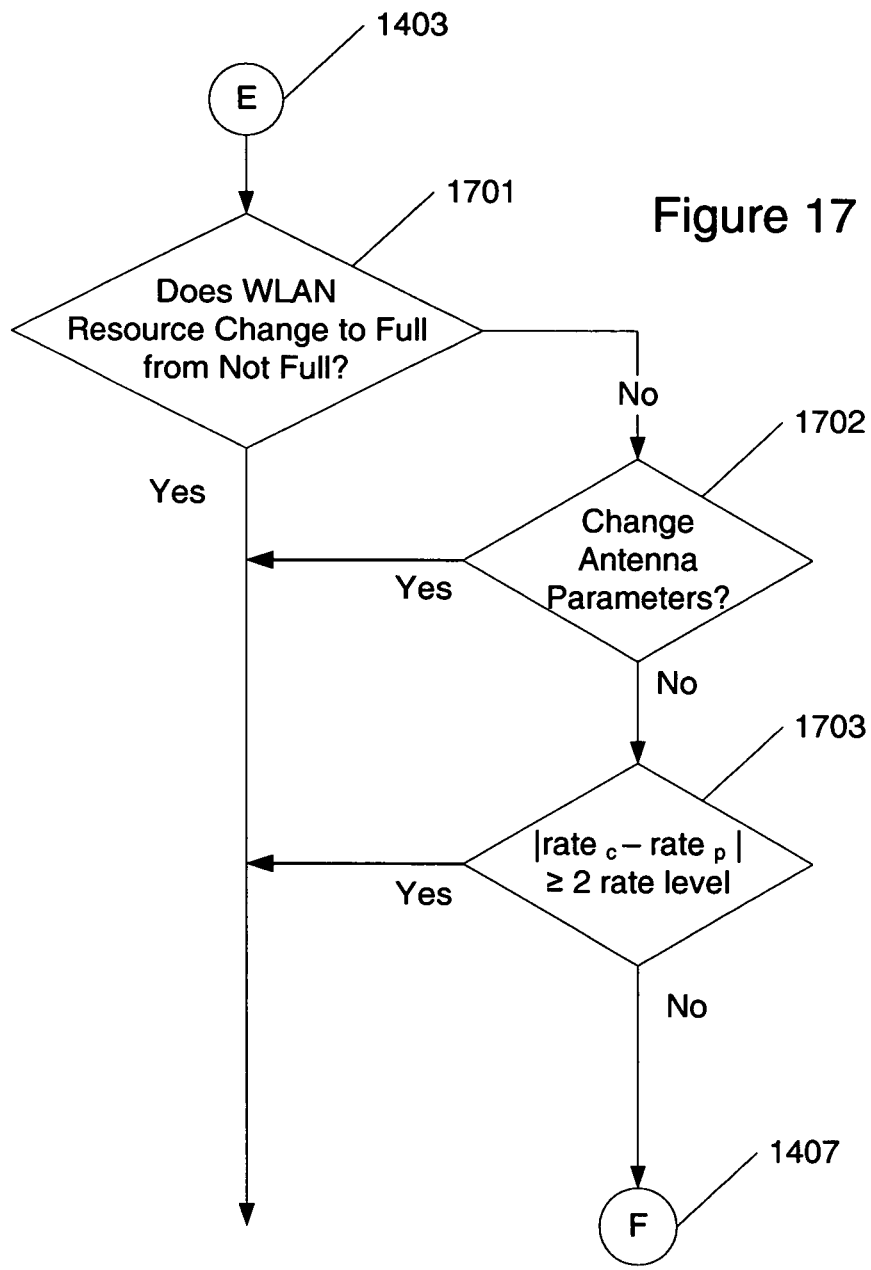

Example 8 shows a process where a station reduces the frequency of TPC using the margin shown in examples 2 and 3 above. Here, FIGS. 14, 16, and 17 show the process of example 8. Here, at point E 1403, the process continues with FIG. 17. In step 1701, a station checks whether a WLAN resource has changed from full to not full. If yes from step 1701, then the process continues with exchanging the RTS/CTS signals of FIG. 14. If no from step 1701, the system determines if there was a change in antenna parameters in step 1702. If no, then in step 1703, the system checks if the difference between a current rate and a previous rate is greater than or equal to two times a rate level. If no from step 1703, the process continues to point F 1407. If yes from any of steps 1702 or 1703, then the process continues with exchanging the RTS/CTS signals of FIG. 14. The process may then continue with FIG. 16 at point D 1406 as described above.

Here, in FIG. 17, the station requires TPC, because WLAN resource management changes to full from not full and the AP asks every station to send with its maximum power. If no from the determination step, the station examines the necessity of TPC. Alternatively, "Change antenna parameter" information can be used either optionally or be a requirement.

EXAMPLE 9

Figure 18:
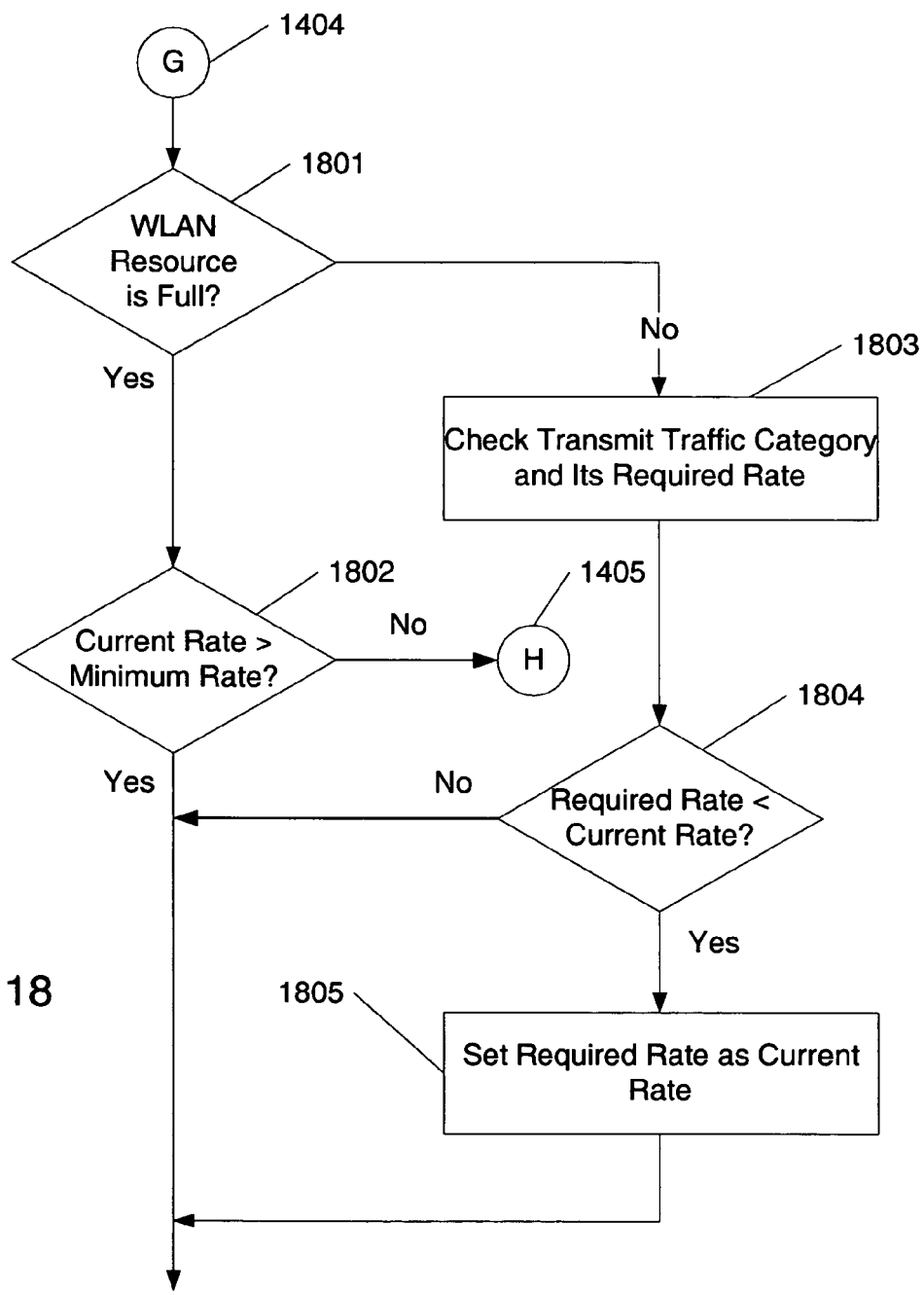

That process of example 9 is shown in FIGS. 14 and 18. From point G 1404, a station then determines in step 1801 whether a WLAN resource is full. If yes, then the station determines if a current rate is greater than a minimum rate in step 1802. If no, then the process returns to point H 1405 in FIG. 14. If yes, then the process continues with the exchange of the RTS/CTS signals in FIG. 14. If no from step 1801, the transmit traffic category and its require rate are examined in step 1803. Next, in step 1804, the system determines if the required rate is less than a current rate. If no, then the process continues with the exchange of the RTS/CTS signals in FIG. 14. If yes, then the system sets the required rate as the current rate in step 1805. Next, the process continues with the exchange of the RTS/CTS signals in FIG. 14.

Here, the AP instructs all stations the minimum required rate when WLAN resource is full or almost full. When a station wants to send a payload, but the WLAN resource is full or almost full, the AP sends a required rate. The station compares the current rate with this AP's required rate. If the current rate is higher than the required rate, this station can send. But if the current rate is lower than the required rate, this station cannot send any data.

Optionally, the AP requires the minimum rate not only when the resource is full but also for other reasons. For example, even if the resource is not full, if one station transmits large scale of data with very low rate, it affects other stations and reduces the number of VoIP stations.

Further, it is also possible in this case that AP does not send the minimum required rate and AP examines the station's transmit rate. In this way, station sends RTS at first, but when the AP determines that a station's transmit rate is lower than the required rate, the AP does not send the CTS.

However, in this way, other stations in the same AP or in the same array must to set the NAV and may be prevented from sending any data for a while.

EXAMPLE 10

Figure 19:
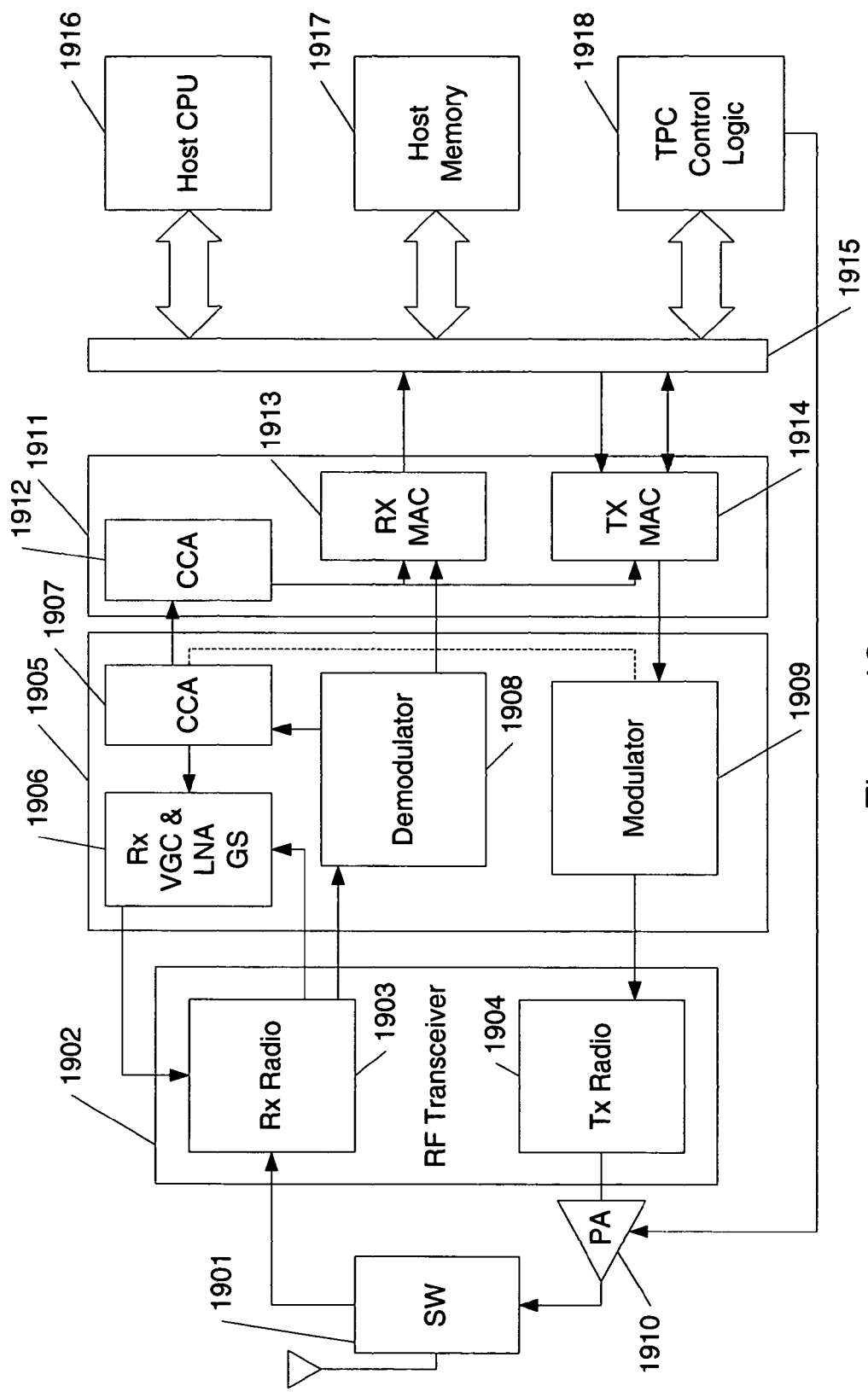
FIG. 19 shows an illustrative example of a base station in accordance with aspects of the present invention.
Figure 20:
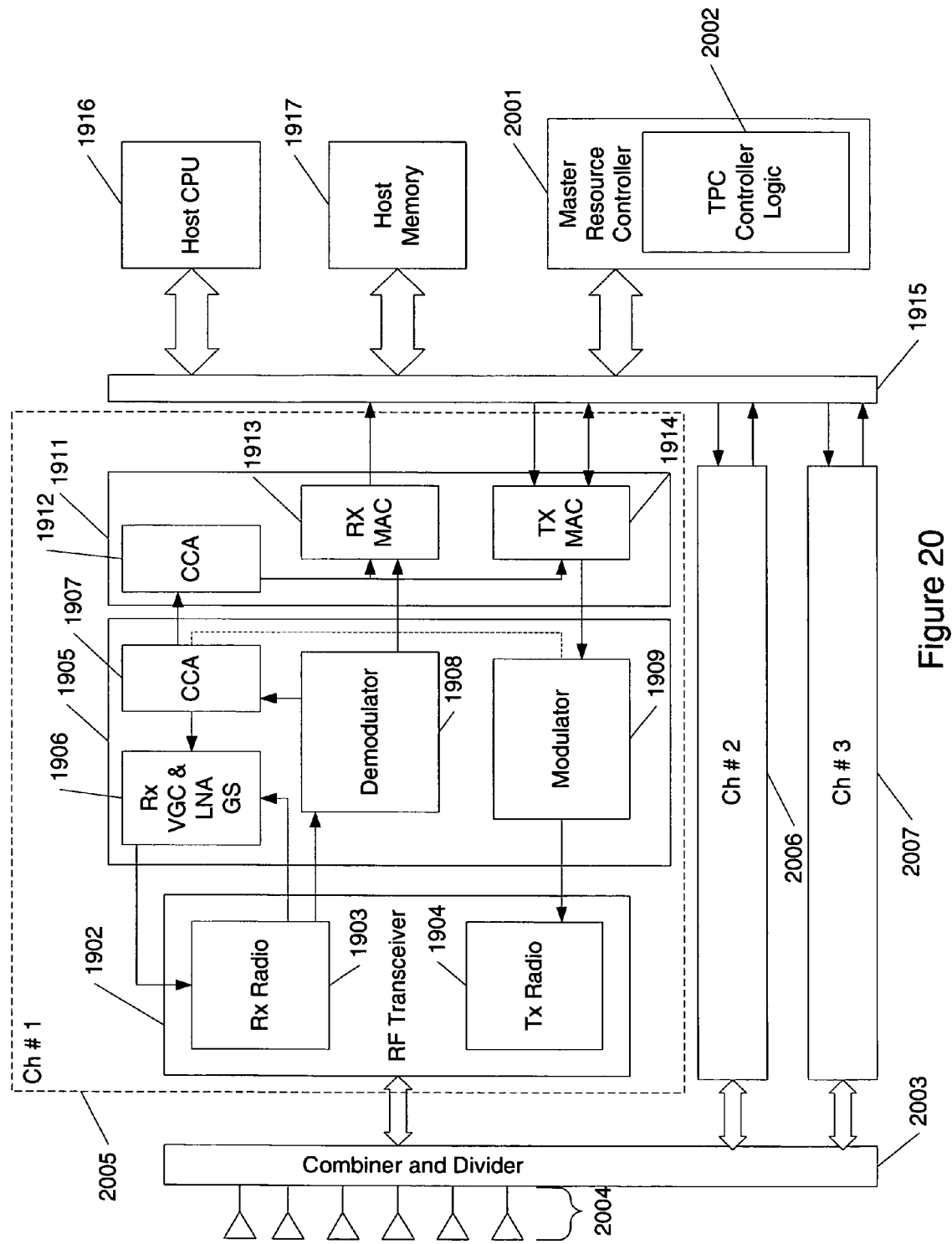

FIG. 19 shows an illustrative example of block diagram of a station. FIGS. 20-21 show block diagrams of illustrative AP to realize the above mentioned control schemes. These figures focus on blocks related to TPC and the link adaptation process. It is also possible the other configurations, for example, "TPC controller logic" may be included in a MAC or connected directly to a MAC. Further, the TPC controller logic may be included in a host CPU or other locations.

FIG. 19 includes SW 1901 forwarding received signals to RF transceiver 1902. In RF transceiver 1902, receive radio 1903 forwards received data to the BB physical layer 1905. The BB physical layer 1905 includes receive variable gain control and LNA GS 1906 and demodular 1908, both of which receive data from receive radio 1903. Demodulator 1908 transmits signals to MAC 1911 and clear channel assessment CCA 1907. CCA 1907 provide signals to VGC and LNA GS 1906, which then controls receive radio 1903. CCA also transmits signals to CCA 1912 in MAC 1911. Signals from CCA 1912 and demodulator 1908 are received by Rx MAC 1913 and transmitted to PCI bus 1915. From PCI bus 1915, the system may exchange data with any of host CPU 1916, host memory 1917, and TPC control logic 1918. Tx MAC 1914 in MAC 1911 receives data from PCI bus 1915 CCA 1912, and transmitted to modulator 1909 in BB physical layer 1905. Information may be exchanged between modulator 1909 and CCA 1907. Modulator 1909 that outputs data to transmit radio 1904 in RF transceiver 1902. PA 1910 then receives control signals from TPC control logic 1918 and signals from transmit radio 1904 and sends them to SW 1901 for transmission.

Link adaptation may generally be performed by done by "Tx MAC" using information from CCA (Clear Channel Assessment) 1917 or 1912. At first when the station wants to send a payload and, if the TPC is required at every transmitting opportunity (see examples 1-3 above), Tx MAC 1914 sends a TPC request signal using a Probe request or Action or any other frame. If TPC is required at every several opportunities, Tx MAC 1914 or TPC controller logic 1918 examines the requirements for TPC using at least one of transmit rate and received power information, which may be derived from link adaptation unit in Tx MAC 1914 or CCA 1907 or 1912.

When a station receives a TPC response from an AP, the station picks up a value of difference information at Rx MAC 1913 and sends this information to TPC controller logic 1918. TPC controller logic 1918 controls PA 1910 to change the transmit power. It is also possible that Rx MAC 1913 controls PA directly. In the cases where station checks a transmit data category and its required rate, the necessary tables are located in the memory, which is in MAC or host memory. Then TPC controller logic 1918 or Tx MAC 1914 accomplishes the control using information from both link adaptation unit and memory.

FIGS. 20 and 21 show illustrative examples of access points. Components similar to those of FIG. 19 are not described. The access point shown in FIG. 20 includes a master resource controller 2001 that may include TPC logic controller 2002. As connected to PCI bus 1915. Each access point may include a combiner and divider 2003 with antenna elements 2004 providing access to various channels (channels 1-3 (2005-2007) shown here for example).

When each channel 2005-2007 in AP receives a signal, that received power information may be noted and stored. When each channel receives a signal which includes a TPC required slot, receiver MAC 1913 sends a control signal to TPC controller logic unit 2002 indicating it that should initiate a TPC calculation. In FIGS. 20 and 21, PCI bus 1915 connects MAC 1911 and TPC controller logic 2002, thereby allowing all channels use the same TPC controller logic 2002. It is also possible that TPC controller logic 2002 may be located within each MAC 1911 for each channel.

Next, a value of difference information may be sent to Tx MAC 1914 and conveyed in the transmit signal. Various tables may be stored in memory, which is located in MAC 1911 or host memory 1917.

When AP controls link adaptation and TPC considering the WLAN resource, Master resource controller 2001 controls the WLAN resource. FIG. 20 shows the case that each AP has a master resource controller 2001 and FIG. 19 shows the case that master resource controller 2108 is located in the backbone network and it controls resources for multiple APs.

FIG. 21 shows access points with multiple channels 2101-2103 communicating with PCI bus 1915. PCI bus may be connected with host CPU 2104, host memory 2105, and TPC controller logic 2106. Host CPU 2104 and TPC controller logic 2106 may be connected to Ethernet 2109, which may be connected to other access points 2107 and master resource controller 2108. It is also possible that each channel has its own master resource controller 2108.

The following provides examples of various policies described above.
1. AP always emphasizes throughput.
2. AP always emphasizes transmit power.
3. AP always leaves it to each station which policy stations should select.
4. Basically AP leaves it to each station and only if a network becomes crowded, AP emphasizes throughput.

If AP selects 3 or 4 mentioned above and each station decides how to select policy, the following examples may further be considered:
1. Station always emphasizes throughput.
2. As far as AP doesn't indicates to emphasize throughput, station always emphasizes transmit power.
3. If station is without power supply (and/or the rest of power is low), it emphasizes transmit power, if not it emphasizes throughput.
4. Station selects throughput or transmit power according to an application. (For example, station emphasizes throughput only if it sends/receives video application)

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for controlling power comprising the steps of:
   determining if a change in data rate has occurred;
   comparing said current data rate to a previous data rate;
   modifying a transmit power of a mobile terminal when said comparing step indicates a change in data rate greater than or equal to a predetermined rate change level; and
   determining if a network is at or near capacity,
   wherein said modifying step is at least partially based on an outcome of said network determining step.

2. The method according to claim 1, wherein said predetermined rate change level is 2.

3. The method according to claim 1, wherein said determining step determines that said change in data rate has occurred based on a change in data type.

4. A system for modifying transmit power for a mobile terminal transmitting data to an access point comprising:
   a processor that determines if a change in data rate has occurred, compares a current data rate to a previous data rate, and modifies said transmit power of said mobile terminal when said change in data rate is greater than or equal to a predetermined data rate change level.

5. The system according to claim 4, wherein said processor is in said mobile terminal.

6. The system according to claim 4, wherein said processor is in said access point.

7. The system according to claim 4, further comprising:
an antenna that transmits said data at an adjusted transmit power level.

* * * * *

UNITED STATES PATENT AND TRADEMARK OFFICE
CERTIFICATE OF CORRECTION

PATENT NO. : 8,463,308 B2  
APPLICATION NO. : 10/968244  
DATED : June 11, 2013  
INVENTOR(S) : Matsuo et al.

Page 1 of 1

It is certified that error appears in the above-identified patent and that said Letters Patent is hereby corrected as shown below:

In the Specification

In Column 2, Line 64, delete "802.111h" and insert -- 802.11h --, therefor.

In Column 5, Line 63, delete "$(G_A \neq G_B \neq G_C, G_A' \neq G_B \neq G_C')$" and insert -- $(G_A \neq G_B \neq G_C, G_A' \neq G_B' \neq G_C')$ --, therefor.

In Column 9, Line 35, delete "shows a" and insert -- shows an --, therefor.

In Column 10, Line 44, delete "(b-m3)." and insert -- (b-3). --, therefor.

In Column 11, Line 6, delete "that is" and insert -- that it --, therefor.

In Column 13, Line 13, delete "Next. A" and insert -- Next, a --, therefor.

In the Claims

In Column 16, Line 65, in Claim 4, delete "predetermined data rate" and insert -- predetermined rate --, therefor.

Signed and Sealed this  
Twenty-eighth Day of October, 2014

Michelle K. Lee  
*Deputy Director of the United States Patent and Trademark Office*